US012075230B2

(12) United States Patent
Park et al.

(10) Patent No.: US 12,075,230 B2
(45) Date of Patent: Aug. 27, 2024

(54) WATER DRAINAGE STRUCTURE AND COIL WIRE CONNECTION STRUCTURE FOR 2-WAY TYPE MICROSPEAKER

(71) Applicant: BUJEON CO., LTD., Ansan-si (KR)

(72) Inventors: Minkoo Park, Hwaseong-si (KR); Seungwoo Chun, Hwaseong-si (KR)

( * ) Notice: Subject to any disclaimer, the term of this patent is extended or adjusted under 35 U.S.C. 154(b) by 0 days.

(21) Appl. No.: 18/359,329

(22) Filed: Jul. 26, 2023

(65) Prior Publication Data

US 2023/0370781 A1 Nov. 16, 2023

Related U.S. Application Data

(62) Division of application No. 17/320,449, filed on May 14, 2021, now Pat. No. 11,800,291.

(30) Foreign Application Priority Data

May 28, 2020 (KR) ........................ 10-2020-0064238
May 28, 2020 (KR) ........................ 10-2020-0064258
Feb. 25, 2021 (KR) ........................ 10-2021-0025864

(51) Int. Cl.

| | |
|---|---|
| ***H04R 9/06*** | (2006.01) |
| ***H04R 1/02*** | (2006.01) |
| ***H04R 1/06*** | (2006.01) |
| ***H04R 1/24*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |

(52) U.S. Cl.
CPC ............... *H04R 9/06* (2013.01); *H04R 1/023* (2013.01); *H04R 1/025* (2013.01); *H04R 1/06* (2013.01); *H04R 1/24* (2013.01); *H04R 7/12* (2013.01); *H04R 7/18* (2013.01); *H04R 9/025* (2013.01); *H04R 9/046* (2013.01); *H04R 2400/11* (2013.01)

(58) Field of Classification Search
CPC . H04R 9/06; H04R 1/023; H04R 1/06; H04R 1/24; H04R 7/12; H04R 7/18; H04R 9/025; H04R 9/046; H04R 2400/11
USPC .......................................................... 381/335
See application file for complete search history.

(56) References Cited

FOREIGN PATENT DOCUMENTS

| | | | | |
|---|---|---|---|---|
| KR | 20090066538 A * | 6/2009 | ............. | H04R 9/045 |
| KR | 10-2252018 B1 | 5/2021 | | |

* cited by examiner

*Primary Examiner* — Sean H Nguyen
(74) *Attorney, Agent, or Firm* — KORUS Patent, LLC; Seong Il Jeong

(57) ABSTRACT

The present invention provides a microspeaker having a water drainage structure capable of rapidly discharging water, entering the microspeaker, to the outside. In the case of a woofer-tweeter speaker, water is discharged through the side and bottom of a housing, and in the case of a 1-way speaker, water is discharged through the side of a housing. In addition, the present invention provides a connection portion that is formed to position a plurality of soldering points, to which a woofer wire and a tweeter wire are bonded, not outside a driver but inside or at the boundary of a space formed by the driver in a TWS-type 2-way micro-speaker. This secures design freedom and save space by reducing the overall length of a small speaker.

7 Claims, 23 Drawing Sheets

WATER DRAINAGE STRUCTURE AND COIL WIRE CONNECTION STRUCTURE FOR 2-WAY TYPE MICROSPEAKER

CROSS-REFERENCE TO RELATED APPLICATION

This application claims the benefit of Korean Patent Application Nos. 10-2020-0064238, 10-2020-0064258, and 10-2021-0025864 filed on May 28, 2020, May 28, 2020, and Feb. 25, 2021, respectively, which are hereby incorporated by reference herein in their entirety.

BACKGROUND

1. Technical Field

The present invention relates to a water discharging structure for a microspeaker, i.e., a water discharge or drainage structure for a microspeaker. The present invention relates to a waterproof structure for a 2-way type microspeaker that has high magnetic flux density and can perform efficient sound pressure tuning.

In addition, the present invention relates to a coil connection structure for a 2-way type microspeaker that is suitable for true wireless stereo (TWS). In particular, the present invention relates to a coil connection structure for a 2-way type microspeaker that can secure design freedom and save space.

2. Description of the Related Art

A speaker uses a principle that is opposite to that of a microphone and in which an electrical signal is converted into a sound wave. A speaker is an electronic product in which, when a current enters a coil, a magnet turns into an electromagnet having its own magnetic field and vibrates the coil by using attractive and repulsive actions alternately pulling and pushing sound waves through contact with the surrounding constant magnetic field to make the diaphragm sound, thereby generating sound waves and outputting sound.

Moisture or water deteriorates the performance of electronic components such as a speaker, and many water-repellent or water-blocking structures have been proposed.

Korean Patent Application No. 10-2019-019267 discloses a structure in which a partition wall is placed inside a speaker and blocks the inflow of water. Korean Utility Model Registration No. 20-0412710 proposes a structure in which a multi-stage step structure is employed and thus water is discharged to the side in the opposite direction. Korean Patent Application Publication No. 10-2019-0084403 discloses a process of forming a water-repellent layer on a microspeaker component. From a different point of view, Korean Patent Application Publication No. 10-2019-019267 discloses a technology that radiates a specific frequency when there is moisture or foreign matter in a component and thus moves the foreign matter to a discharge pipe by means of vibration force.

However, as a speaker becomes a necessity, a microspeaker having a structure for draining water when water enters the speaker in an environment in which the inflow of water cannot be avoided, such as rainy weather, an underwater environment or hot weather, has not been proposed yet. The presence of water inside fine electronic components such as microspeakers adversely affects the overall performance of the device, so that it is necessary to introduce a structure that discharges water rapidly and efficiently.

By taking into consideration the above situations, the present inventors developed a microspeaker having a structure capable of efficiently draining water entering the speaker.

Meanwhile, common microspeakers are designed and manufactured to perform both a low-frequency woofer function and a high-frequency tweeter function. This type of speakers use one diaphragm. In the case of large speakers used for audio, 2-way type speakers including a separate diaphragm for a woofer in charge of a low-frequency band of about 40 to 500 Hz and a diaphragm for a tweeter in charge of a high-frequency band of 20,000 Hz have been popularized. There are also speakers further including a squawker in charge of the frequencies in the mid-band.

With this point in view, a technology that installs separate diaphragms for a woofer and a tweeter in a microspeaker is being developed. In this case, the lower portion of a voice coil attached to the diaphragm of the woofer and the lower portion of a voice coil attached to the tweeter diaphragm are respectively drawn out and connected to connection members connected to an external circuit.

As a related patent, Japanese Unexamined Patent Application Publication No. 2011-130227 discloses a structure in which a soldering part is installed on the bottom surface of a tweeter holder located under a tweeter and the terminals of woofer and tweeter coils are connected to the soldering part. This structure is a typical coil connection structure for a 2-way type microspeaker. Since a coil connection portion is located outside a driver including the tweeter, the drawing out of the coil is complicated. Accordingly, it occupies that much space, it is disadvantageous to a reduction in the overall length of the microspeaker, and thus a disadvantage arises in that it does not fit the recent trend of the miniaturization of TWS products.

Therefore, the present invention was contrived to positively reflect the disadvantages of the conventional 2-way speaker described above and the trend of currently developed technology.

SUMMARY

Therefore, an object of the present invention is to provide a 2-way type microspeaker that can rapidly and efficiently discharge introduced water and protect fine components from the remaining and infiltration of water.

Another object of the present invention is to provide a 2-way type microspeaker that has high magnetic flux density and can efficiently perform sound pressure tuning.

Another object of the present invention is to provide a connection structure capable of securing design freedom and saving space by installing a connection part for easily soldering each wire to one side of the tweeter diaphragm in a 2-way type microspeaker having a woofer and a tweeter and also provide a 2-way type microspeaker including the connection structure.

According to an aspect of the present invention, there is provided a 2-way type microspeaker including a woofer diaphragm, a first coil located between central and boundary portions of the woofer diaphragm, a main magnet disposed inside the first coil, a first support including a column extending through a center of a space formed by the magnet while covering an upper portion of the main magnet, a sub-magnet installed outside the first coil, and a second support configured to surround the sub-magnet from an outside, wherein there is installed a first screen that extends to a height that allow the first screen to cover a space between a top surface of the second support and a lower portion of the woofer diaphragm while covering an outer periphery of the second support and that has an open window for draining water on a side thereof.

The 2-way type microspeaker may further include a tweeter diaphragm, a second coil disposed between central and boundary portions of the tweeter diaphragm to surround a lower portion of the column of the first support, and a lower plate configured to extend and be spaced apart from a bottom surface of the sub-magnet while supporting a bottom surface of the main magnet, and also configured such that a rim thereof is bent to surround and press an outer periphery of the tweeter diaphragm, and an outer surface of the lower plate may be installed to face an inner surface of the second support at a predetermined interval and provides a water drainage path.

According to another aspect of the present invention, there is provided a 2-way type microspeaker including a diaphragm, a first coil, a support ring configured to support an outer periphery of the diaphragm, a main magnet, and an upper plate, wherein a ring-shaped support plate having a bottom surface extended to come into contact with a top surface of the support ring is located on an outer side; wherein a cap-shaped drainage housing is located on an inner side of the support plate; wherein a top surface of the drainage housing covers the main magnet; wherein drainage holes for drainage are formed on both sides; and wherein a side under the drain hole is in close contact with an inner side of the support plate.

According to another aspect of the present invention, there is provided a 2-way type microspeaker including a woofer diaphragm, an upper coil located between central and boundary portions of the woofer diaphragm, a main magnet disposed inside the upper coil, a sub-magnet installed outside the upper coil, and a tweeter diaphragm disposed to face the woofer diaphragm, wherein the microspeaker has an appearance formed by an upper casing configured to cover a top of a driver and a lower casing configured to cover a rest of the structure, the woofer diaphragm having a pressed edge is installed between a side edge of the upper casing and an auxiliary ring, a cylindrical lower coil is disposed upward between central and boundary portions of the tweeter diaphragm, and the microspeaker further includes a central support configured such that a top surface thereof is in contact with an upper portion of the main magnet, a center thereof extends downward in a shape of an empty cylinder and is accommodated inside the lower coil, and a top surface of the cylinder is covered with a mesh and a lower support configured such that it supports a bottom surface of the main magnet and an outer surface thereof comes into contact with and closes the tweeter diaphragm.

According to another aspect of the present invention, there is provided a 2-way type microspeaker including a woofer diaphragm, a first coil located between central and boundary portions of the woofer diaphragm, a main magnet disposed inside the first coil, a sub-magnet installed outside the first coil, a tweeter diaphragm disposed to face the woofer diaphragm, and a second coil located between central and boundary portions of the tweeter diaphragm, wherein a split plate, which is a non-magnetic chain, is installed to support a bottom surface of the sub-magnet beyond an upper end of the second coil while supporting an overall bottom surface of the main magnet, and wherein a support ring that presses and seals an edge of the tweeter diaphragm while pressing the remaining exposed bottom surface of the sub-magnet and the outside of the split plate is installed to provide an open hole at a predetermined distance from a bottom surface of an outer casing covering the speaker.

According to another aspect of the present invention, there is provided a 2-way type microspeaker including a woofer diaphragm, a first coil located between central and boundary portions of the woofer diaphragm, a main magnet disposed inside the first coil, a sub-magnet installed outside the first coil, a tweeter diaphragm disposed to face the woofer diaphragm, and a second coil located between central and boundary portions of the tweeter diaphragm, wherein a central support having a body covering the upper surface of the main magnet and a column extending downward into the space between the ring gap forming the main magnet is installed, wherein a split plate, which is a non-magnetic material, does not come into contact with the sub-magnet, and is installed to support a bottom surface of the main magnet, extend to an outside, be bend downward and press and compress an edge of the tweeter diaphragm, and wherein bonding for waterproofing is applied to a portion where the split plate comes into contact with the edge of the tweeter diaphragm.

According to another aspect of the present invention, there is provided a 2-way type microspeaker including a woofer diaphragm, a first coil located between central and boundary portions of the woofer diaphragm, a main magnet disposed inside the first coil, a sub-magnet installed outside the first coil, a tweeter diaphragm disposed to face the woofer diaphragm, and a second coil located between central and boundary portions of the tweeter diaphragm, wherein the microspeaker further includes: a woofer plate configured such that it surrounds the first coil from an inner surface thereof, comes into contact with an inner side of a top surface of the sub-magnet, extends to be gradually inclined upward from an outer side of a top surface, and supports the woofer diaphragm from a bottom surface thereof and a plurality of windows configured to transmit woofer vibration sound is formed in a body thereof; and a split support configured such that it covers a top surface of the sub-magnet not in contact with the woofer plate, extends downward while supporting its side surface, comes into contact with a casing at an outer surface thereof, and is installed to be spaced apart from a center line in a longitudinal direction of the speaker by a predetermined distance, thereby providing a path for transmission of vibration sound radiated from the woofer diaphragm.

According to still another aspect of the present invention, there is provided a 2-way type microspeaker including a woofer diaphragm, a first coil located between central and boundary portions of the woofer diaphragm, a main magnet disposed inside the first coil, a sub-magnet installed outside the first coil, a tweeter diaphragm disposed to face the woofer diaphragm, and a second coil located between central and boundary portions of the tweeter diaphragm, wherein the microspeaker further includes: a sub-upper plate including a first sub-upper plate supporting an inside of a top surface of the sub-magnet and having a stepped portion, and a second sub-upper plate supporting an outside of a remaining top surface of the sub-magnet and extending to a lower side of the sub-magnet; and a side support configured such that it extends inward from a bottom to support a bottom surface of the sub-magnet, a top surface thereof is spaced apart from the woofer diaphragm so that woofer vibration sound is transmitted to a space between a casing and the sub-magnet forming an appearance of the speaker, and it is installed to be spaced apart from a center line in a longitudinal direction of the speaker by a predetermined distance, thereby providing a path through which woofer vibration sound is transmitted.

According to still another aspect of the present invention, there is provided a 2-way type microspeaker including a woofer and a tweeter, wherein a connection portion to which a woofer wire drawn from a woofer voice coil coupled to a woofer diaphragm and a tweeter wire drawn from a tweeter voice coil coupled to a tweeter diaphragm are bonded is disposed on one side of the tweeter diaphragm.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Objects and effects of the present invention, and technical configurations for achieving them will become apparent with reference to the embodiments described later in detail together with the accompanying drawings. In the following description of the present invention, when it is determined that a detailed description of a known function or configuration may unnecessarily obscure the subject matter of the present invention, a detailed description thereof will be omitted.

Throughout the specification, when a part is described as "including" a component, it means that other components may be further included rather than being excluded unless specifically stated to the contrary. Meanwhile, in the embodiments of the present invention, each component, functional block or mean may include one or more subcomponents.

First, individual embodiments of a water drainage structure for a microspeaker of the present invention will be described.

First Embodiment

Figure 1:
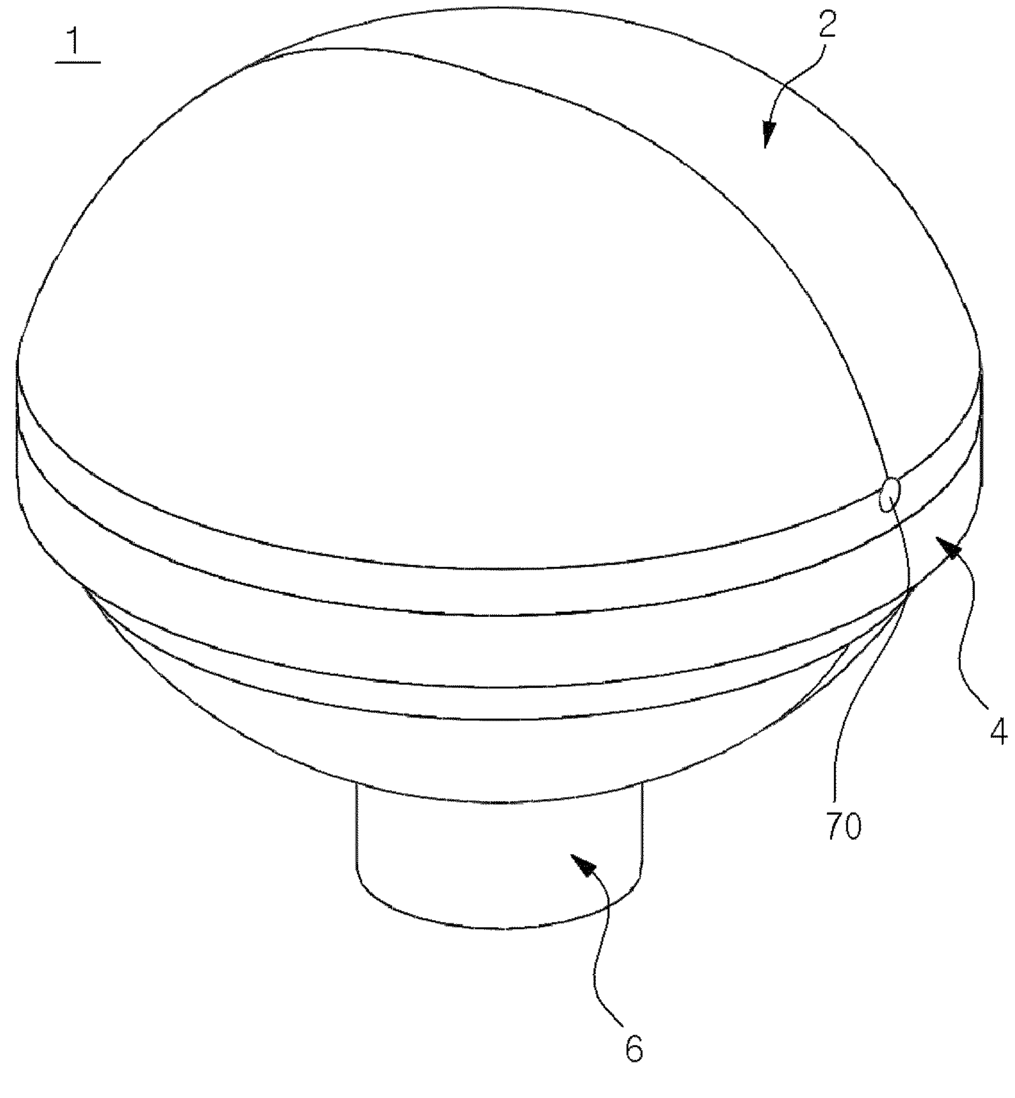
FIG. 1 is a perspective view of the appearance of a microspeaker according to the present invention.

FIG. 1 is a perspective view of the appearance of a microspeaker 1 of the present invention. The microspeaker 1 is a 2-way speaker, and mainly includes a dome-shaped upper case 2 covering a woofer and a lower case 4 formed as an ear cap covering a tweeter. A water discharge hole 70 is formed in a side of the lower portion of the upper case 2. A sound emission hole 6 configured to be inserted into an ear of a user is formed in the center of the bottom surface of the lower case 4.

Figure 2:
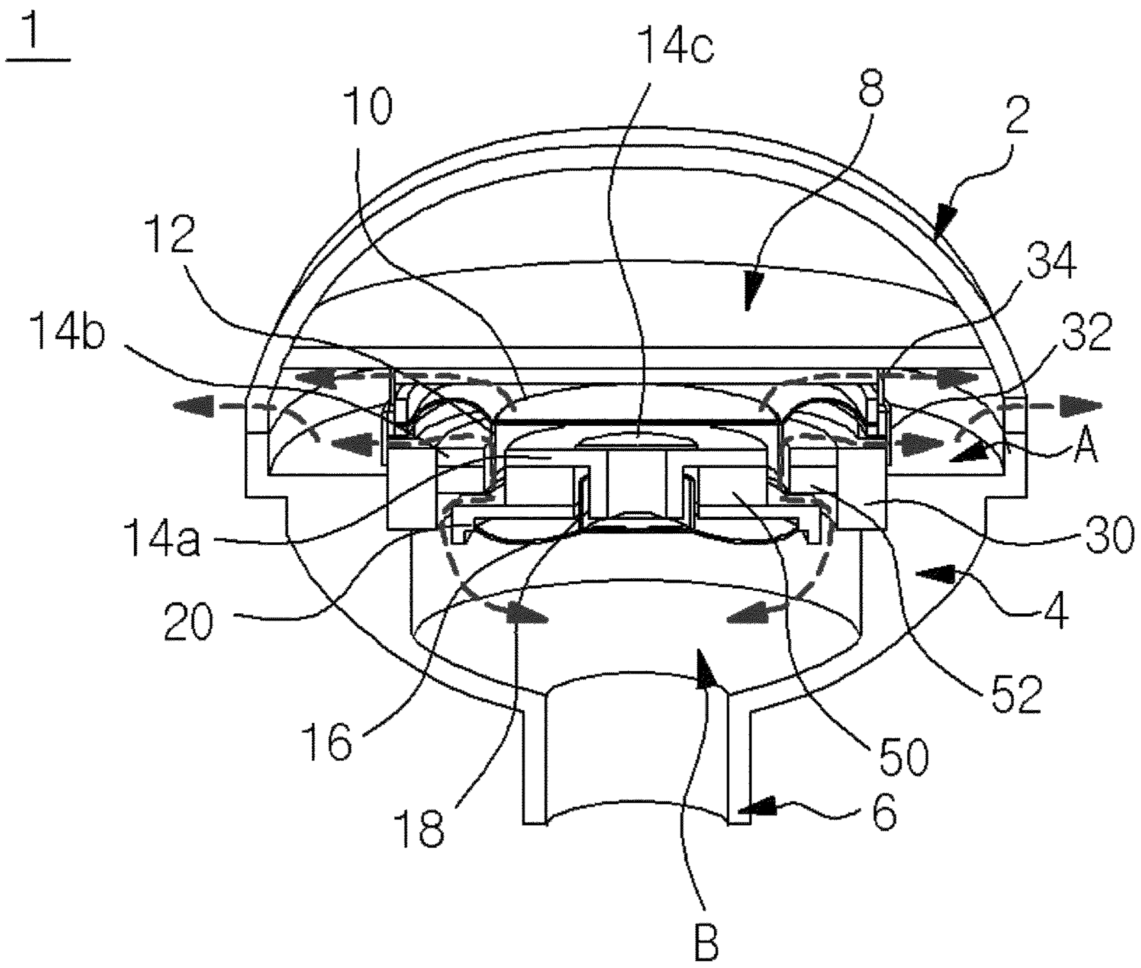
FIG. 2 is a front sectional view of the speaker of FIG. 1 taken along the center thereof.
Figure 3:
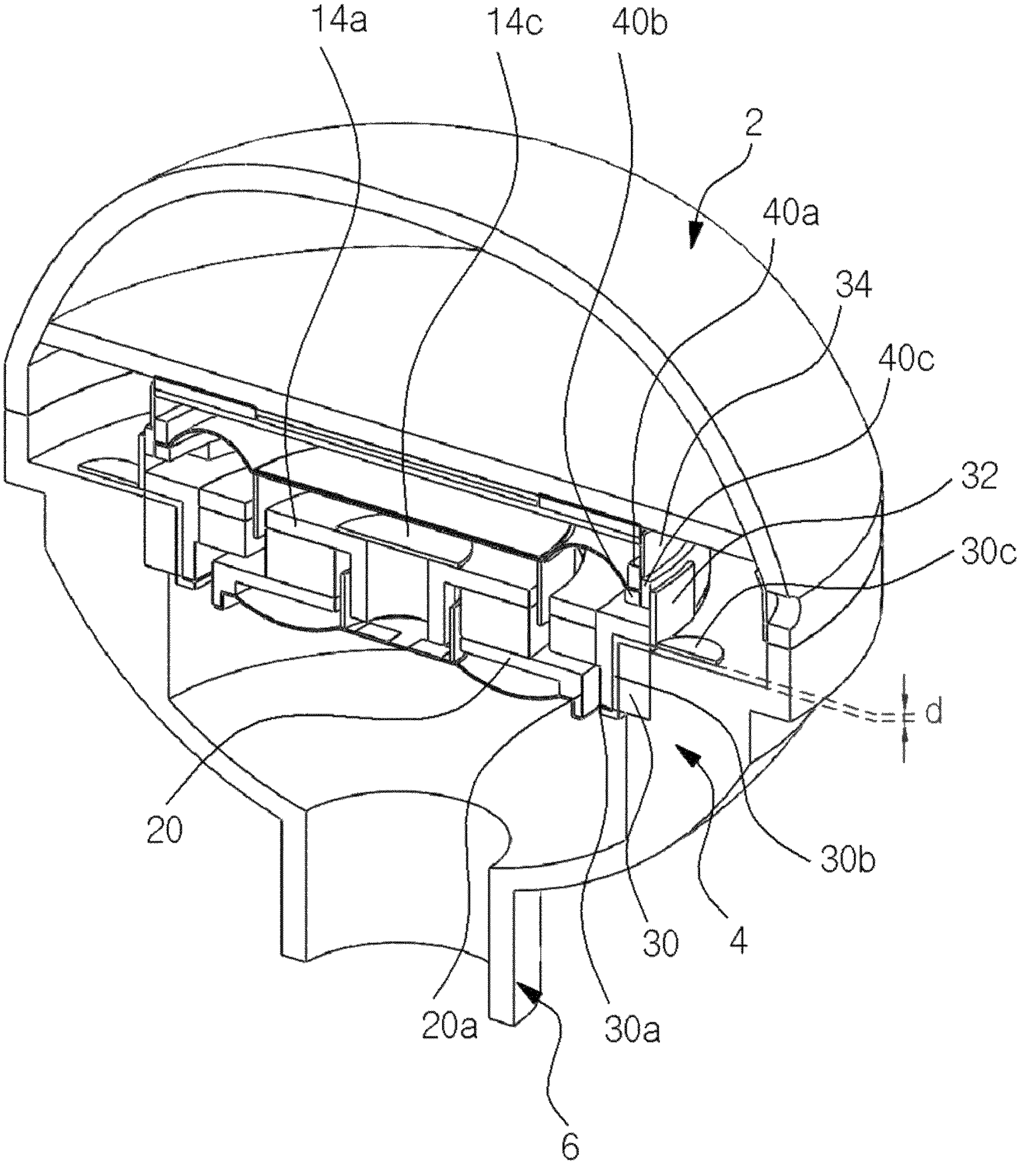
FIG. 3 is a perspective view illustrating the water drainage structure of the speaker of FIG. 2 in greater detail.

FIG. 2 is a front sectional view of the speaker of FIG. 1 taken along the center thereof. FIG. 3 is a perspective view illustrating the water drainage structure of the speaker of FIG. 2 in greater detail. Since a woofer-tweeter structure constituting a part of the 2-way speaker is known to those skilled in the art, it will be described to the extent necessary.

A disc-shaped woofer grill 8 is installed under the upper case 2. A space in which hardware is mounted is provided above the woofer grill 8. A first coil 12 is disposed between the central and boundary portion of a woofer diaphragm 10, and a ring-shaped main magnet 50 is disposed inside the first coil 12. A first support 14*a* is installed to pass through the center of a space formed by the magnet ring while covering the top of the main magnet 50. Although the central column of the first support 14*a* is hollow, a waterproof mesh 14*c* is installed on the top of the first support 14*a*, and prevents water from entering a driver.

A ring-shaped sub-magnet 52 is also installed outside the first coil 12, and an upper plate 14*b* is disposed thereon. A second support 30 having a thick ring shape is fixed to the stepped portion of the lower case 4 so as to surround the sub-magnet 52 and the upper plate 14*b* from the outside. The first and second supports 14*a* and 30 may be viewed as forming a yoke part.

As shown well in FIG. 3, an upper support ring 40*a* at the top and a lower support ring 40*b* at the bottom press the rim of the woofer diaphragm 10 in order to support the rim of the woofer diaphragm 10. The outer peripheries of the two support rings 40*a* and 40*b* are supported by a side support ring 40*c*. The bottom surface of the lower support ring 40*b* is installed to be spaced apart from the top surface of the second support 30, which provides a water drainage path.

According to the present invention, a first screen 32 configured to provide a water drainage path is installed up to at least a height covering the space between the second support 30 and the lower support ring 40*b* while covering the outer periphery of the second support 30. As shown in FIG. 3, the first screen 32 is installed to be spaced apart by a distance d based on the sectional surface of the speaker. An open space or window through which water is discharged is provided by the distance d, and a water drainage path is formed through the space or window, as shown in FIG. 2.

According to the present invention, the second screen 34 configured to provide a water drainage path extends to come into contact with the woofer grill 8 near the boundary portion between the side support ring 40*c* and the upper and lower support rings 40*a* and 40*b*. The second screen 34 is installed to be spaced apart by at least a distance d based on the sectional surface of the speaker, like the first screen 32, as shown in FIG. 3. An open space or a window through which water is discharged by the distance is provided, and a water drainage path is formed through the space, as shown in FIG. 2.

The upper, lower and side support rings 40*a*, 40*b*, 40*c* and the second support 30 are all formed in continuous ring shapes, are not cut in the centers thereof, and tightly compresses the diaphragm. The first and second screens 32 and 34 are separately installed to provide an interval. The first and second screens 32 and 34 do not need to be semi-annular rings such as half rings, and may be rectangular plates, as shown in the drawing.

Next, a tweeter diaphragm 16 is installed inside the lower case 4, and a second coil 18 is disposed between the central and boundary portions so as to surround the column-shaped lower portion of the first support body 14*a*. The lower plate 20 supporting the bottom surface of the main magnet 50 extends while being spaced apart from the bottom surface of the sub-magnet 52, and the rim of the lower plate 20 is bent to surround and compress the periphery of the tweeter diaphragm 16.

As shown well in FIG. 3, the outer surface 20*a* of the lower plate 20 is installed to face the inner surface 30*a* of the second support 30 at a predetermined interval. This interval provides a discharge path for which water is discharged through the sound emission hole 6.

Referring to FIG. 2, the water drainage structure of the present invention is summarized and described below. First, due to the waterproof mesh 14*c* covering the top of the central column of the first support 14*a*, water cannot enter the space of the driver formed by the main magnet 50. The water present outside the driver flows to the side through the second screen 34 above the woofer diaphragm 10 and the first screen 32 below the woofer diaphragm 10 based on the woofer diaphragm 10, is collected in a space A, and is discharged to the outside through the water discharge hole 70. In addition, the water present outside the driver flows downward along the interval in the periphery of the tweeter diaphragm 16, is collected into the space B, and is discharged to the outside through the sound emission hole 6.

The woofer diaphragm 10 is naturally wider than the tweeter diaphragm 16, and the tweeter diaphragm 16 is adjacent to the sound emission hole 6. Accordingly, it will be able to understand that it is quick to discharge water through the side as possible from the viewpoint of the woofer diaphragm 10 and discharge water through the lower part, i.e., the sound discharge port 6 as possible from the viewpoint of the tweeter diaphragm 16. This point of view constitutes the core of the first embodiment of the present invention, and the shape, size, and arrangement of each part may be appropriately changed or deleted.

In the present invention described above, a water-repellent coating may be applied to each part in order to protect the part.

Meanwhile, in FIG. 3, an additional water drainage path not shown in FIG. 2 is shown. In other words, a flow path 30*b* is formed through the inside of the second support 30, and a semicircular blocking deck 30*c* is formed on the inner top surface of the lower case 4 to form a narrow channel communicating with the flow path 30*b*. In particular, since this structure allows the space A and the space B to communicate with each other, and thus a water discharge effect may be further improved.

Second Embodiment

Figure 4:
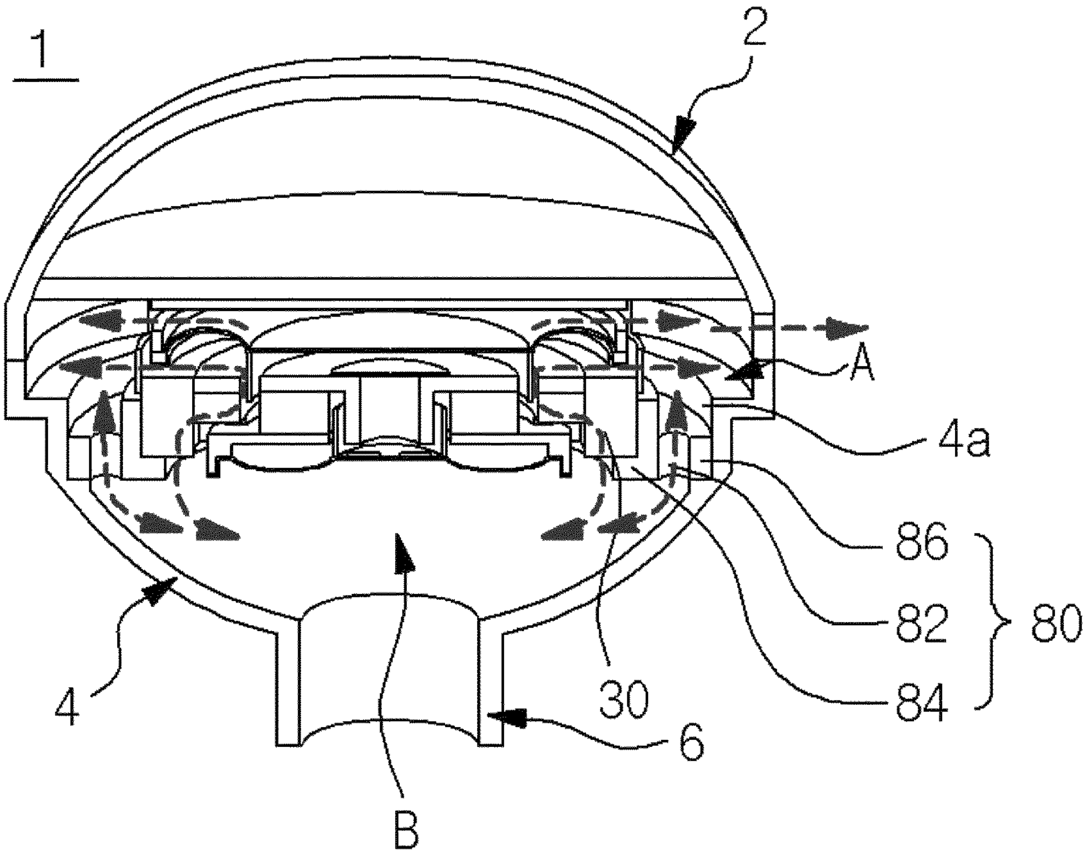
FIG. 4 is a front sectional view of a speaker according to a second embodiment of the present invention taken along the center thereof.
Figure 5:
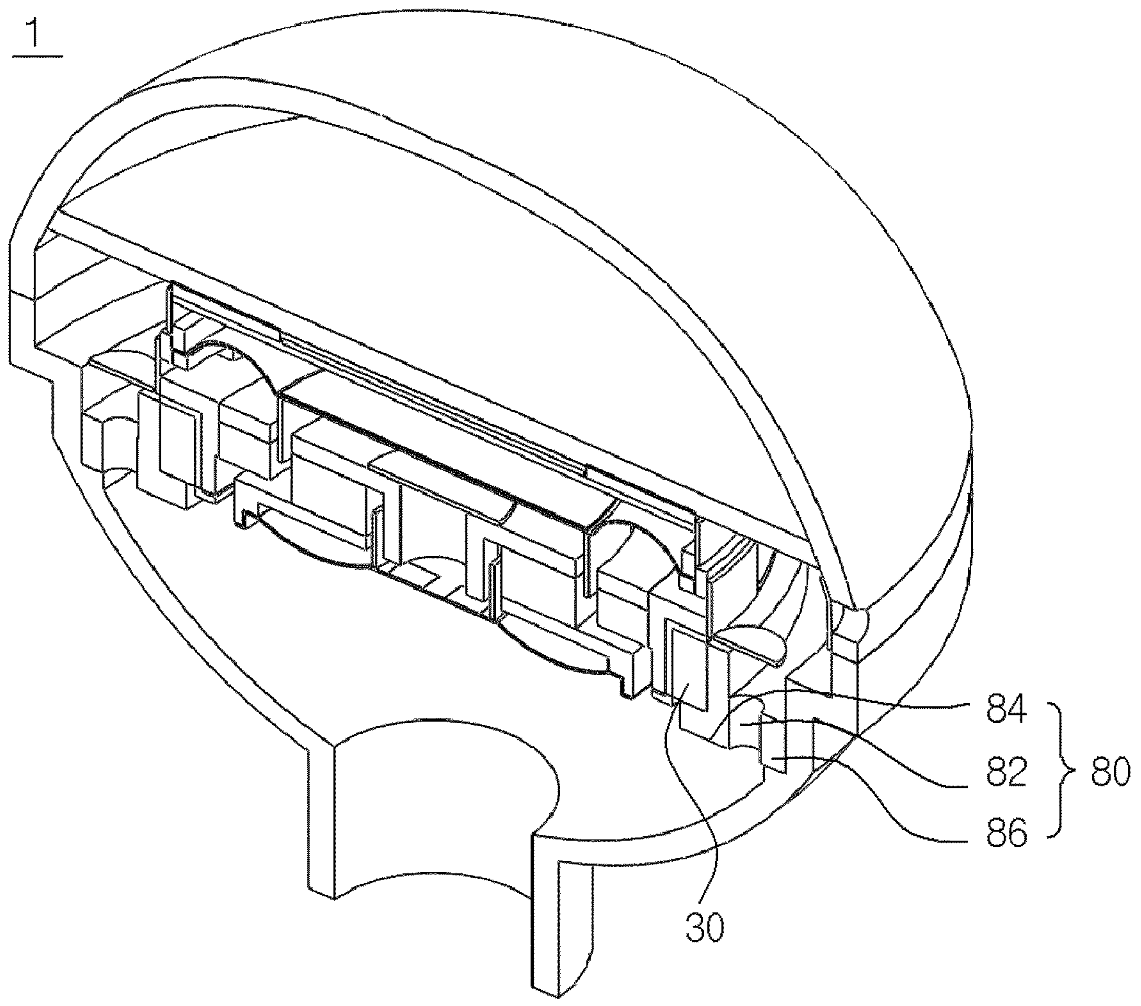
FIG. 5 is a perspective view illustrating the water drainage structure of the speaker of FIG. 4 in greater detail.

FIG. 4 is a front sectional view of a speaker according to a second embodiment of the present invention taken along the center thereof. FIG. 5 is a perspective view illustrating the water drainage structure of the speaker of FIG. 4 in greater detail. The microspeaker 1 according to the second embodiment of the present invention will be described with a focus on the differences between the first embodiment and the second embodiment.

The second embodiment differs from the first embodiment in that that the thick portion of the lower case 4 where the second support 30 is fixed to the stepped portion of the lower case 4 is removed and a ring structure 80 configured to discharge water is separately installed between the inner side 4*a* of the newly exposed lower case 4 and the second support 30. The ring structure 80 includes a first portion 84 configured to support the second support, and a second portion 86 configured to come into contact with the side surface 4*a* and provide a circular flow path 82.

Since a space A and a space B communicate with each other through the flow path 82, the effect of discharging water may be further improved.

Third Embodiment

Figure 6:
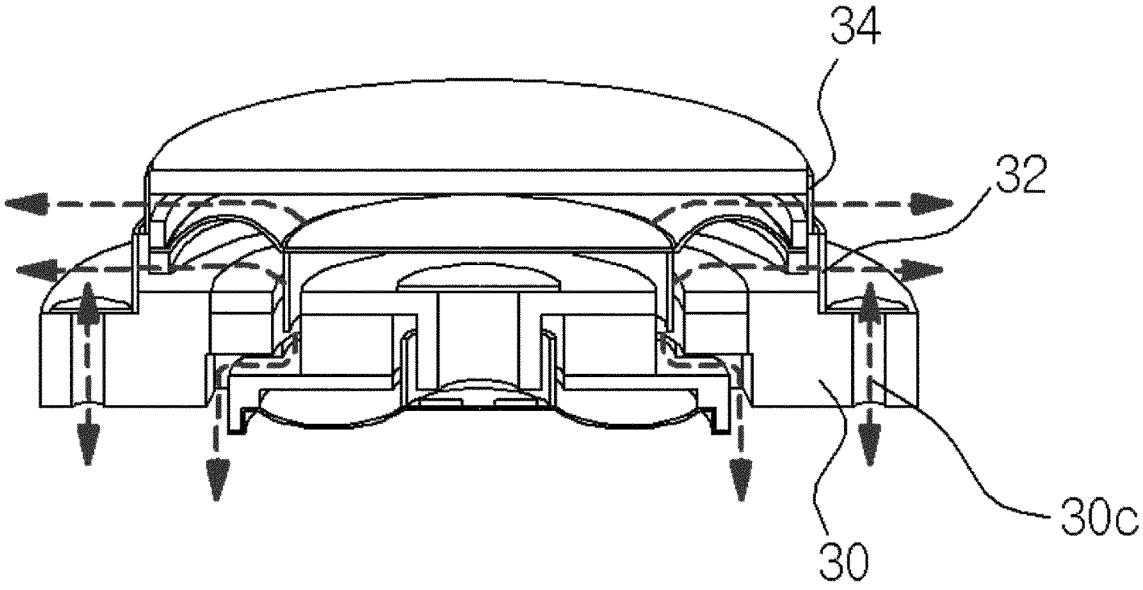
FIG. 6 is a front sectional view of a speaker according to a third embodiment taken along the center thereof.

FIG. 6 is a front sectional view of a speaker according to a third embodiment taken along the center thereof with the illustration of upper and lower cases 2 and 4 omitted. The microspeaker 1 according to the third embodiment of the present invention will be described with a focus on the differences between the first embodiment and the second embodiment.

The third embodiment differs from the first embodiment in that that the thick portion of the lower case 4 where the second support 30 is fixed to the stepped portion of the lower case 4 is removed and a second support 30 is extended and installed to a newly exposed space. A flow path 30*c* is vertically formed in the expanded portion.

Since a space A and a space B communicate with each other through the flow path 30*c*, the effect of discharging water may be further improved.

Fourth Embodiment

Figure 7:
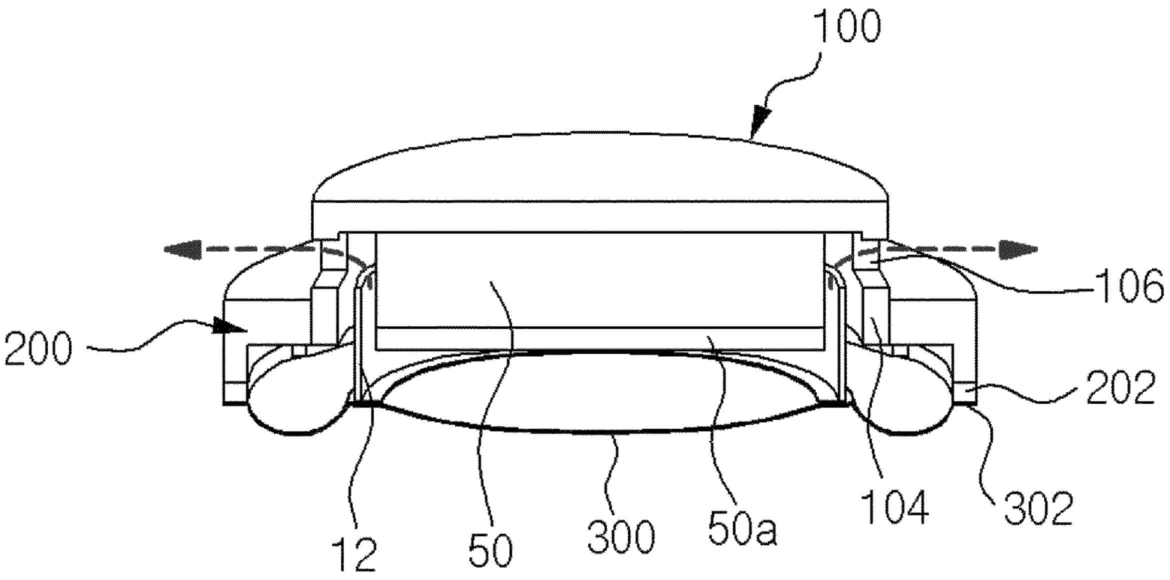
FIG. 7 is a front view of a speaker according to a fourth embodiment of the present invention taken along the center thereof.

FIG. 7 is a front view of a speaker according to a fourth embodiment of the present invention taken along the center thereof. The fourth embodiment is directed to a 1-way speaker unlike the above-described embodiments. Since the detailed structure of the 1-way speaker is well known to those skilled in the art, it will be described to the extent necessary.

A speaker 1 of the present invention according to the fourth embodiment includes a diaphragm 300, a first coil 12, a support ring 202 supporting the outer periphery 302 of the diaphragm 300, a main magnet 50, and an upper plate 50*a*.

The ring-shaped support plate 200 configured such that the bottom surface thereof is extended to come into contact with the top surface of the support ring 202 is positioned on the outside, and a cap-shaped drain housing 100 is positioned on the inner side of the support plate 200. The top surface of the water discharge housing 100 covers the main magnet 50, water discharge holes 106 configured to discharge water are formed on both sides, and sides under the water discharge holes 106 are in close contact with the inner side of the support plate 200.

Accordingly, as shown in the drawings, water entering a first coil 12 is blocked by the diaphragm 300, and is rapidly discharged to the outside through the water discharge hole 106 of the water discharge housing 100.

In the above embodiment of the present invention, a water-repellent coating may be applied to a component to protect the component. This will ensure the performance of the component until water is completely discharged from the inside.

Fifth Embodiment

Figure 8:
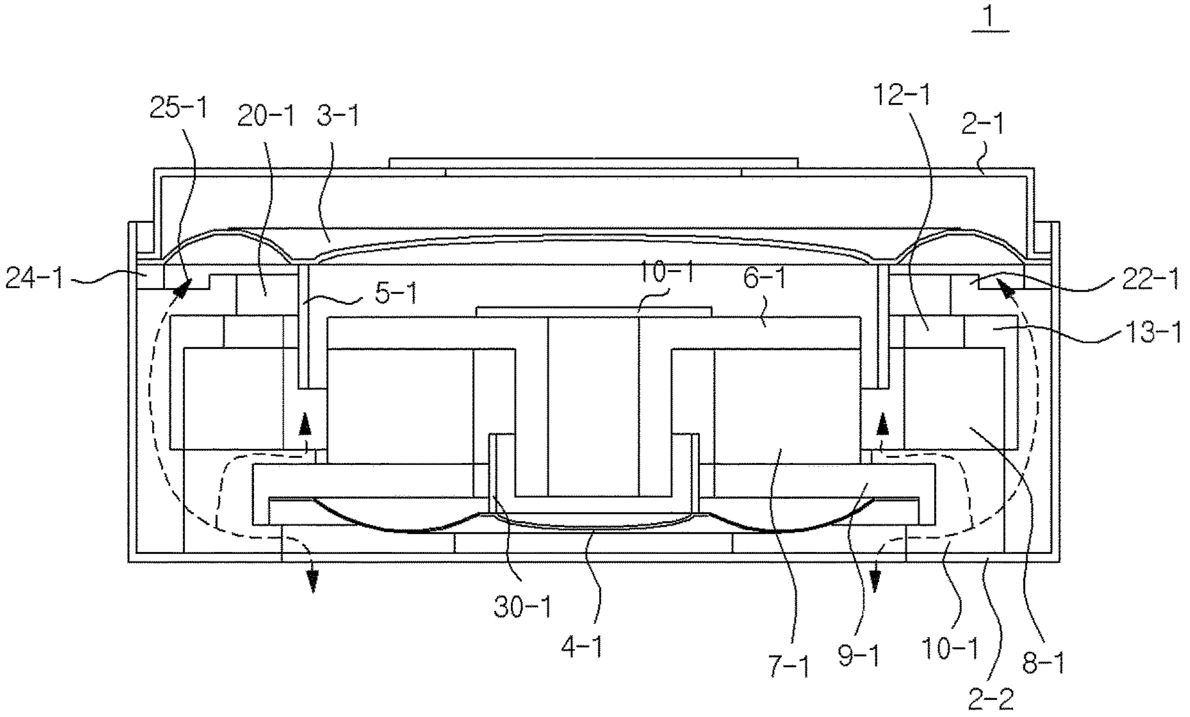
FIG. 8 is a front sectional view of a microspeaker according to a fifth embodiment of the present invention taken along the center thereof.

Next, FIG. 8 is a sectional view of a microspeaker 1 according to another embodiment of the present invention.

The microspeaker 1 has an appearance formed by an outer casing 2-1 configured to cover the top of a driver and a lower casing 2-2 configured to cover most of the rest of the structure. A woofer diaphragm 3-1 with a pressed edge is installed between the side edge of the upper casing 2-1 and an auxiliary ring 24-1.

A cylindrical upper coil 5-1 is disposed downward between the central portion and the side portion of the woofer diaphragm 3-1. A tweeter diaphragm 4-1 is installed adjacent to a sound emission hole to face a woofer diaphragm 3-1, and a cylindrical lower coil 30-1 is placed between the center and side portions of the tweeter diaphragm 4-1. A main magnet 7-1 is mounted inside a space formed by upper and lower coils 5-1 and 30-1, and a sub-magnet 8-1 is disposed outside the upper coil 5-1.

In the present invention, the central support 6-1 has a top surface in contact with the top of the main magnet 7-1, extends downward in a hollow cylindrical shape, and is accommodated inside the lower coil 30-1. The top surface of the cylinder is covered with a mesh 10-1.

In the present invention, the lower support 9-1 supports the bottom surface of the main magnet 7-1, and the outer surface comes into contact with and closes the tweeter diaphragm 4-1.

In the present invention, side supports include first and second side supports 20-1 and 22-1, third and fourth side supports 12-1 and 13-1, and a fifth side support 10-1 from the top. The first and second side supports 20-1 and 22-1 are successively installed to come into contact with the bottom surface of the lower support plate 25-1 installed under the woofer diaphragm 301. The third side support 12-1 is in contact with the inner side of the top surface of the sub-magnet 8-1, and the fourth side support 13-1 is adjacent to the third side support 12-1 and extends downward to cover the remaining outer side of the top surface and the overall side surface of the sub-magnet 8-1. The fifth side support 10-1 surrounds the outer surface of the lower support 9-1, with the top surface thereof coming into contact with the bottom surface of the sub-magnet 8-1 and the bottom surface thereof coming into contact with the bent bottom surface of the lower casing 2-2.

The structures of the side support and the lower casing 2-2 are now described. The second side support 22-1, the fourth side support 13-1, and the fifth side support 10-1 are installed to be spaced apart from the lower casing 2-2. Accordingly, as shown by the arrows, a passage through which the vibration sound of the woofer is transmitted to the lower part or high-pressure air formed in the ear canal is discharged to the upper part is formed.

In addition, at least the fifth side support 10-1 is installed to be spaced apart from the center line in the longitudinal direction of the cross section at a fine interval, e.g., to provide a passage. Accordingly, a path configured to transmit radiated sound and circulating air is formed between the main magnet 7-1 and the sub-magnets 8-1, as shown by arrows.

Sixth Embodiment

Figure 9:
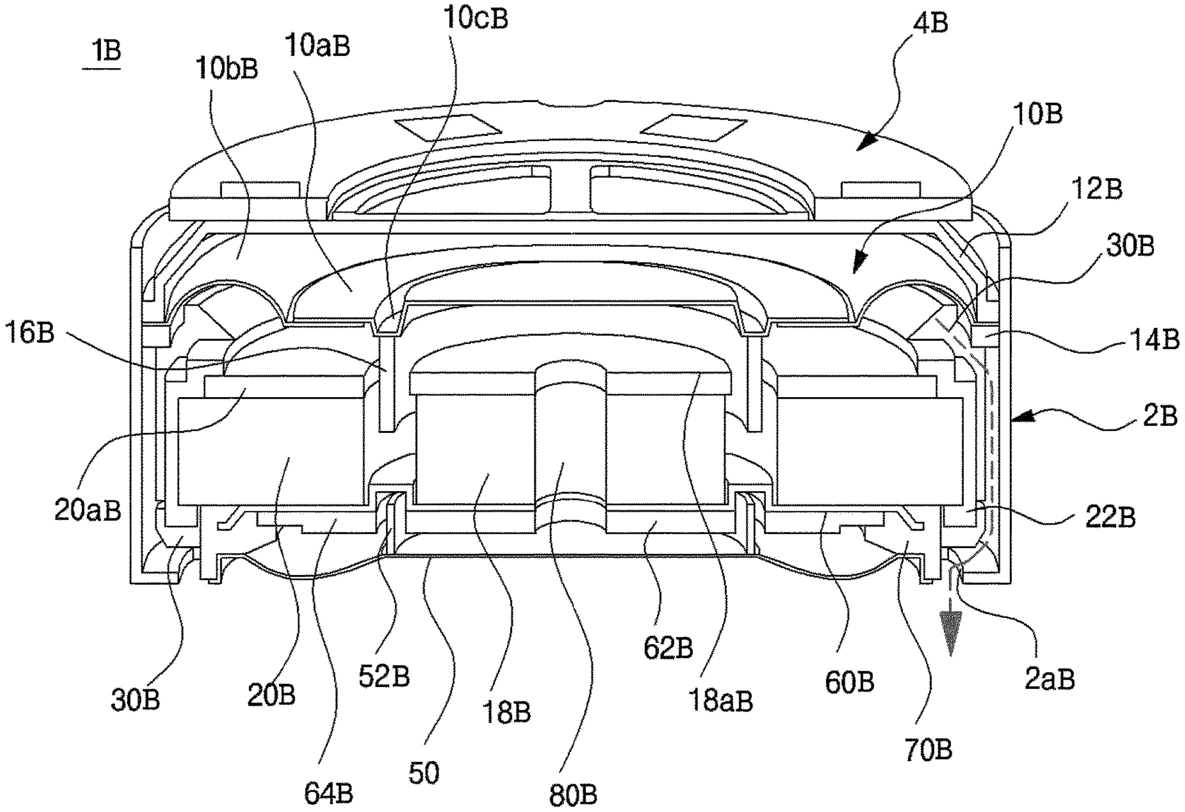
FIG. 9 is a sectional view of a microspeaker according to a sixth embodiment of the present invention taken along the center line thereof in the longitudinal direction thereof.

FIG. 9 is a sectional view of a microspeaker 1B according to the present invention taken along the center line thereof in the longitudinal direction thereof. The microspeaker 1B is a 2-way speaker, and components are contained in a casing 2B on the side and a cover 4B on the upper side. Woofer diaphragms 10B include an inner diaphragm 10*a*B having an inner circumferential groove 10*c*B formed thereon, and an outer diaphragm 10*b*B configured to be airtightly pressed to the bottom surface of the inner diaphragm 10*a*B and having a dome-shaped portion and a rim. The top surface of the rim of the outer vibrating plate 10*b*B is airtightly pressed by the upper support plate 12B and the bottom surface thereof is airtightly pressed by the auxiliary ring 14B. A cylindrical first coil 16B extends downward from the bottom surface of an inner circumferential groove 10*c*B.

A main magnet 18B is disposed inside the first coil 16B, and a sub-magnet 20B is disposed outside the first coil 16B. A main upper plate 18*a*B is disposed above the main magnet 18B, and a sub-upper plate 20*a*B is disposed above the sub-magnet 20B. A side plate 22B surrounding the outsides of the sub-magnet 20B and the sub-upper plate 20*a*B is provided so as to have a predetermined distance from the casing 2B.

The tweeter diaphragm 50B is located at the lowermost side of the microspeaker, and a cylindrical second coil 52B extends upward from the boundary surface of a dome portion and a flat portion to surround the outside of the main magnet 18B. Tweeter vibration sound is radiated from the bottom surface of the tweeter diaphragm 50B through a sound discharge hole below (not shown).

In the present invention, a non-magnetic split plate 60B is installed to support the considerable portion of the bottom surface of the sub-magnet 20B beyond the upper end of the second coil 52B while supporting the overall bottom surface of the main magnet 18B. In addition, the inner support 62B supports the split plate 60B under the main magnet 18B, and the outer support 64B is installed to support the split plate 60B under the sub-magnet 20B. A support ring 70B configured to press and seal the rim of the tweeter diaphragm 50B while pressing the remaining exposed bottom surface of the sub-magnet 20B and the outer portions of the split plate 60B and the outer support 64B is installed such that the side surface thereof has a predetermined distance from the bent lowest bottom surface of a casing 2B, thereby providing an open hole 2*a*B. A portion where the support ring 70B comes into contact with the outer periphery of the tweeter diaphragm 50B is bonded for waterproofing.

In the present invention, a side support 30B is further provided in a space between the casing 2B and the side plate 22B. The top surface of the side support 30B is spaced apart from the woofer diaphragm 10B so that the woofer vibration sound is transmitted. The top surface of the side support 30B extends downward while closely surrounding the side plate 22B, but does not extend to an open hole 2*a*B. The open hole 2*a*B remains open. Unlike other members, the side support 30B is installed to be spaced apart by a predetermined distance from the center line in the longitudinal direction, which is a basis for a cross-sectional view. Since the side support 30B is also installed on the opposite side, which is not shown, a narrow open path is formed along the shown section of the side support 30B as a result. Furthermore, as shown by the arrows, the vibration sound generated by the woofer diaphragm 10B is radiated downward along this path provided by the side support 30B. The woofer vibration sound is substantially blocked in the path between the other member and the member, and does not leak.

Furthermore, in the present invention, a circular hollow hole 80B is formed in the center from the main upper plate 18*a*B to the inner support 62B. In this case, a waterproof mesh (not shown) is installed on the top or bottom surface of the hole 80B and prevents water from penetrating into the driver.

In the sixth embodiment of the present invention, the distance between the inner and outer magnetic field portions is short, and thus the magnetic flux density can be maximized. In particular, the distance between the magnet and the plate is controlled by adjusting the thickness of the split plate 60B. By changing the magnetic permeability according to the selection of the material, the magnetic flux density can be increased or decreased, so that sound pressure tuning through sound pressure control can be effectively performed.

Seventh Embodiment

Figure 10:
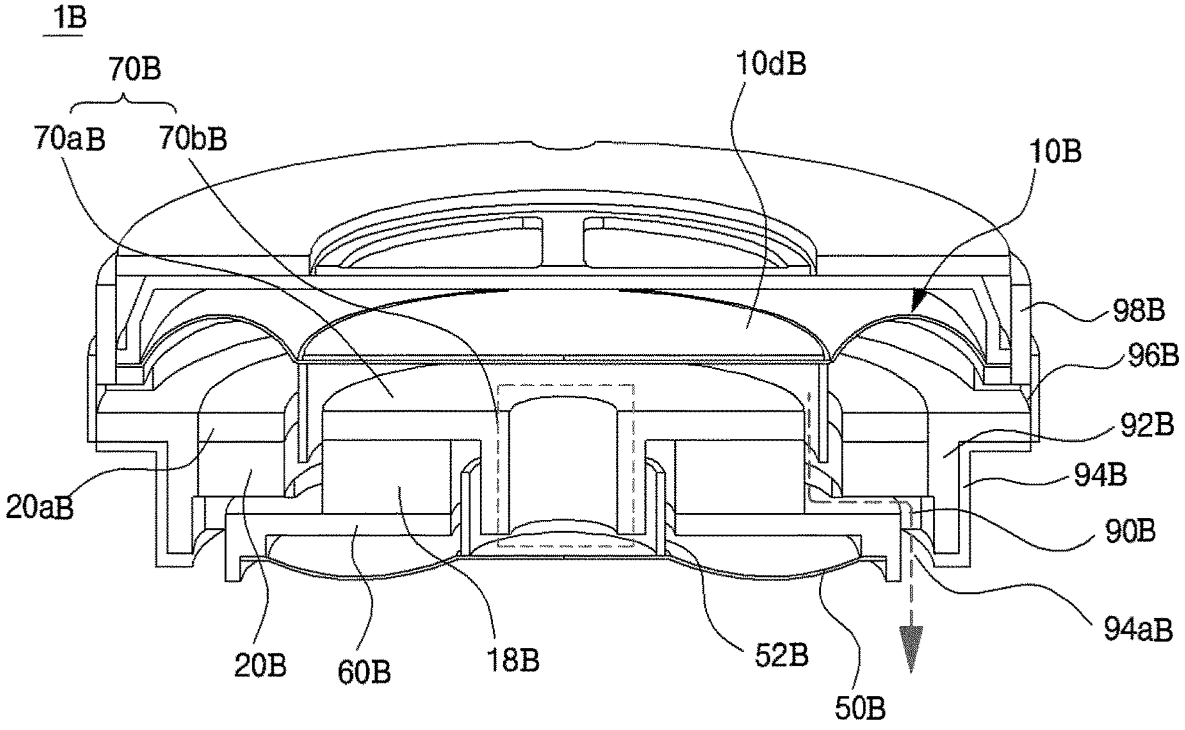
FIG. 10 is a sectional view of a microspeaker according to a seventh embodiment of the present invention taken along the center line thereof in the longitudinal direction thereof.

FIG. 10 is a sectional view of a microspeaker 1B according to a seventh embodiment of the present invention taken along the center line thereof in the longitudinal direction thereof. Descriptions of the parts identical to those of the sixth embodiment will be omitted, and differences will be chiefly described.

In the seventh embodiment, the outer periphery thereof is defined by an upper casing 98B, an intermediate casing 96B, and a lower casing 94B instead of the casing 2B. A woofer diaphragm 10B is a single plate, and an upper plate 10*d*B supports a flat surface in the center. A main magnet 18B has a ring shape, and a central support 70B having a body 70*a*B covering the top surface of the main magnet 18B and a column 70*b*B extending downward into the space between the magnet rings is installed. A second coil 52B installed at the top of the tweeter diaphragm 50B is spaced apart from the column 70*b*B and accommodates it at the outer periphery.

A flanged annular side reinforcement member 92B extends downward while coming into contact with the sub-magnet 20B and the sub-upper plate 20*a*B on the inside and a part of the intermediate casing 96B and the lower casing 94B on the outside. Unlike the first embodiment, due to the side reinforcement member 92B, the path of woofer radiation sound is not provided on the side.

In the seventh embodiment of the present invention, the split plate 60B, which is a non-magnetic material, does not come into contact with the sub-magnet 20B, extends to the outside while supporting the bottom surface of the main magnet 18B, is bent downward, and presses and compresses the edge of the tweeter diaphragm 50B. Bonding for waterproofing is also applied to the portion where the split plate 60B comes into contact with the edge of the tweeter diaphragm 50B.

In the seventh embodiment of the present invention, in order to provide a transfer path for woofer vibration sound, a split support body 90B is provided between the bottom surface of the sub-magnet 20B and the top surface of the split plate 60B, as shown in the drawing. The split support 90B is substantially airtightly sealed between the two members, but is installed to be spaced apart from the center line in the longitudinal direction. Since the split support 90B is also installed on the opposite side, which is not shown, a narrow open path is eventually formed along the illustrated section. There is a height difference between the main magnet 18B and the sub-magnet 20B, so that this open path can be formed naturally.

Furthermore, a radiation hole 94*a*B is formed between the outer surface of the split plate 60B and the inner surface facing the insides of the lower casing 94B and the side reinforcement member 92B. The radiation hole 94*a*B may be viewed as being naturally provided in terms of structure by taking into consideration the fact that the edge of the tweeter diaphragm 50B cannot extend beyond the outermost side of the sub-magnet 20B.

Accordingly, in the seventh embodiment, as shown by the arrows, the vibration sound of the woofer diaphragm 10B flows through the interval between the main magnet 18B and the sub-magnet 20B, follows the path provided by the divided support body 90B, and is transferred to the ear through a sound discharge hole (not shown) via the radiation hole 94*a*B.

In the seventh embodiment of the present invention, the sound radiation part provided by the split support 90B may be used as a water drainage path, and the magnetic flux density is increased or decreased by adjusting the distance between the magnet and the plate through the height adjustment of the sound radiation part, and thus sound pressure tuning can be effectively performed through sound pressure control. Furthermore, it may be possible to appropriately change the magnetic flux density by adjusting the distance between the split plate 60B and the sub-magnet 20B.

Eighth Embodiment

Figure 11:
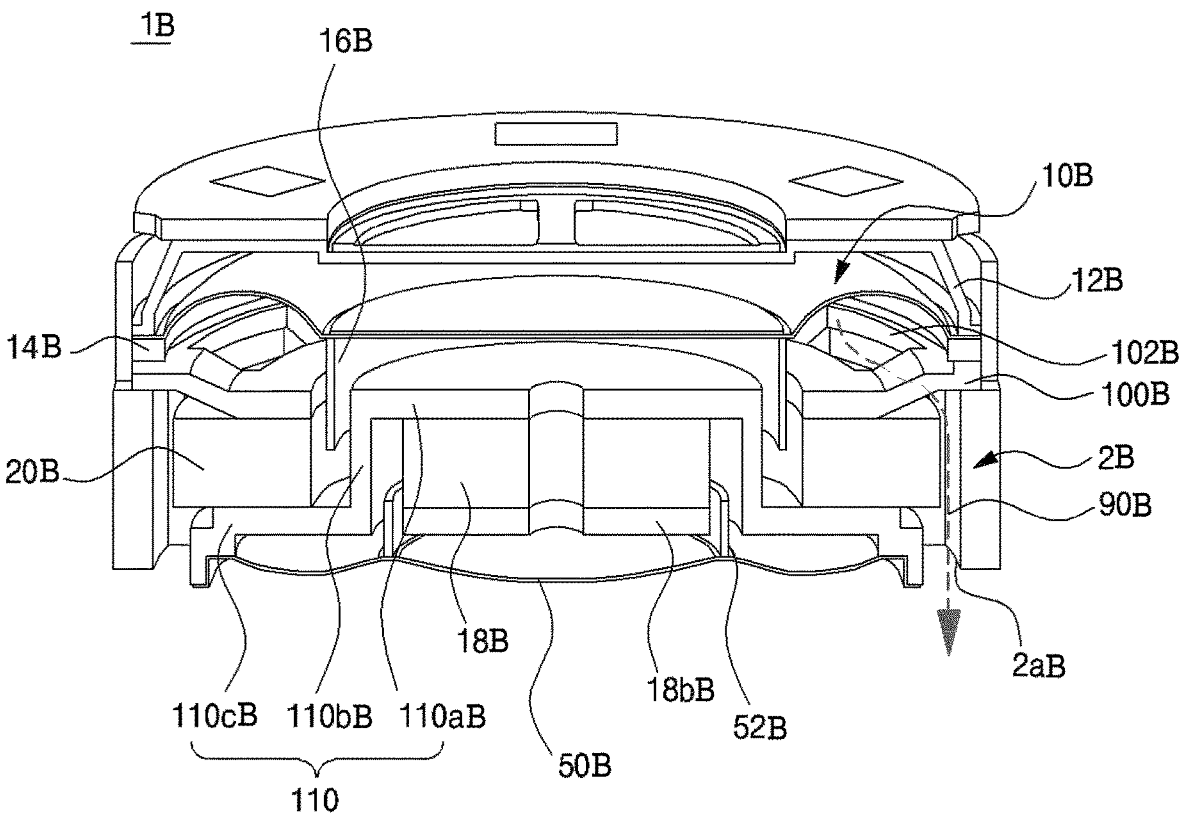
FIG. 11 is a sectional view of a microspeaker according to an eighth embodiment of the present invention along the center line thereof in the longitudinal direction thereof.

The eighth embodiment of FIG. 11 of the present invention is characterized by a woofer plate 100B and a tweeter frame 110B compared to the previous embodiments, and thus these members will be chiefly described.

The woofer plate 100B surrounds the first coil 16B from the inner surface, comes into contact with the inner side of the top surface of the sub-magnet 20B, extends to be inclined upward from the outer side of the top surface, and supports an auxiliary ring 14B from the bottom surface. A plurality of square windows 102B configured to transmit the woofer vibration sound is formed in the body of the woofer plate 100B. In addition, a split support 90B having a structure similar to that of the seventh embodiment, which covers the top surface of the non-contact sub-magnet 20B not in contact with the woofer plate 100B, extends downward while supporting its side surface, and comes into contact with the casing 2B on the outer surface thereof is installed. With this structure of the split support 90B, the vibration sound radiated from the woofer diaphragm 10B is transmitted through the open hole 2*a*B via the window 102B and does not leak through the inner members during this process.

The tweeter frame 110B includes: an top surface 110*a*B supporting the overall top surface of the main magnet 18B; a side surface 110*b*B extending downward between the space formed by the first coil 16B and the second coil 52B at the end of the top surface 110*a*B; and a bottom surface 110*c*B extending horizontally from the side surface 110*b*B to compress the bottom surface of the sub-magnet 20B and having an end bent to seal the edge of the tweeter diaphragm 50B. The outer surface of the bottom surface 110*c*B is spaced apart from the casing 2B, so that the split support 90B is exposed and an open hole 2*a*B is formed at the same time. Bonding for waterproofing is also performed on a portion of the tweeter frame 110B in contact with the edge of the tweeter diaphragm 50B.

Therefore, according to the eighth embodiment of the present invention, as shown by the arrows, the vibration sound of the woofer diaphragm 10B is transferred through the open hole 2*a*B via the window 102B, and the woofer plate 100B, the tweeter frame 110B and the split support 90B are hermetically sealed to each other, and thus there is no concern for the leakage of the woofer vibration sound.

In the eighth embodiment of the present invention, the magnetic flux density flowing through the coil may be adjusted by adjusting the leakage magnetic flux by adjusting the thickness of the tweeter frame 110B, through which sound pressure tuning through the adjustment of sound pressure may be effectively performed.

Ninth Embodiment

Figure 12:
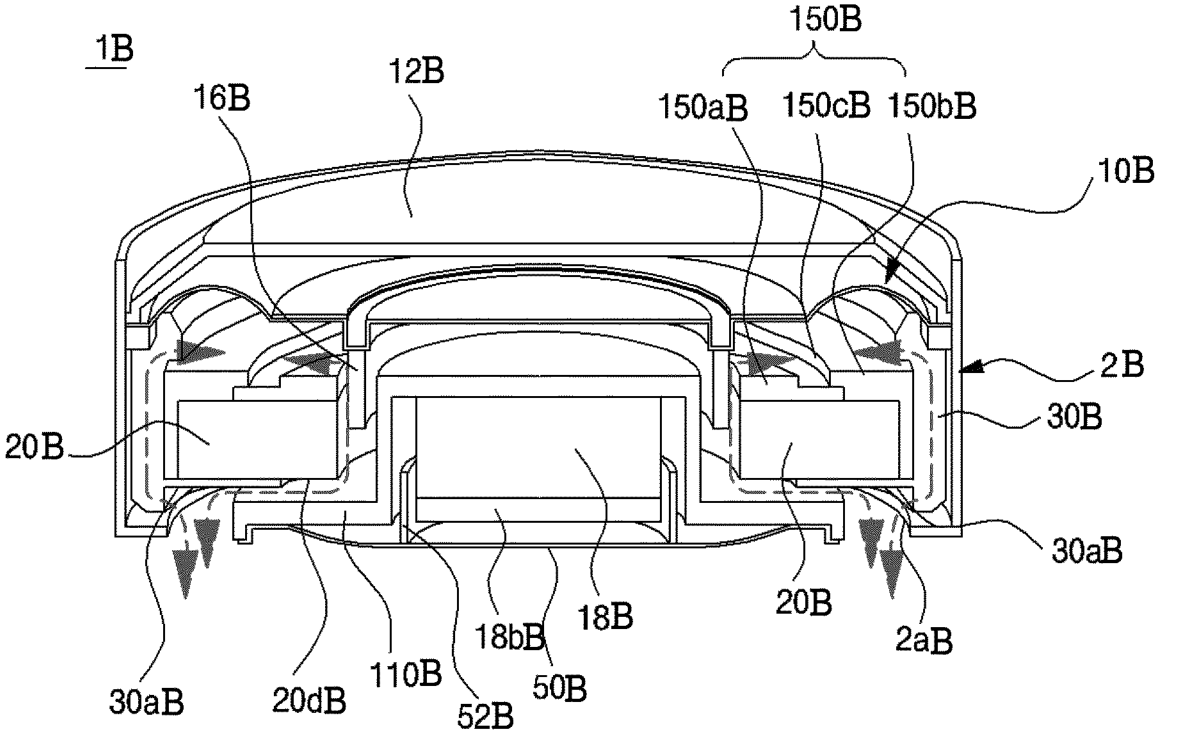
FIG. 12 is a sectional view of a microspeaker according to a ninth embodiment of the present invention along the center line thereof in the longitudinal direction thereof.

The ninth embodiment of FIG. 12 of the present invention is characterized by a sub-upper plate 150B and a side support 30B compared to the previous embodiments, and thus these members will be chiefly described below.

The sub-upper plate 150B includes: a first sub-upper plate 150*a*B supporting an inside of the top surface of the sub-magnet 20B and having a stepped portion; and a second sub-upper plate 150*b*B extending downward while supporting the outer side of the remaining top surface of the sub-magnet 20B and sealing the space between the sub-magnet 20B and the side support 30B. The second sub-upper plate 150*b*B is coupled to the first sub-upper plate 150*a*B to form a channel 150*c*B between itself and the stepped portion.

Furthermore, the side support 30B has the same structure as that of the first embodiment, but further includes a reinforcing plate 30*a*B extending inward from the lower portion and supporting the bottom surface of the sub-magnet 20B. In the ninth embodiment, the height of the sub-magnet 20B is smaller than that of the main magnet 18B, and thus there is the interval between the bottom surface 110*c*B of the tweeter frame 110B and the bottom surface of the sub-magnet 20B, as in the seventh embodiment.

Accordingly, in the ninth embodiment, as shown by the arrows, the vibration sound of the woofer diaphragm 10B passes through the space between the woofer diaphragm 10B and the sub-upper plate 150B, flows through the interval between the main magnet 18*b* and sub-magnet 20B and through the space provided by the side support 30B, and is transferred to the ear through the open hole 2*a*B.

The ninth embodiment of the present invention may also control the magnetic flux density flowing through the coil by adjusting the leakage magnetic flux by adjusting the thickness of the tweeter frame 110B, through which sound pressure tuning through the control of sound pressure may be effectively performed.

Figure 13:
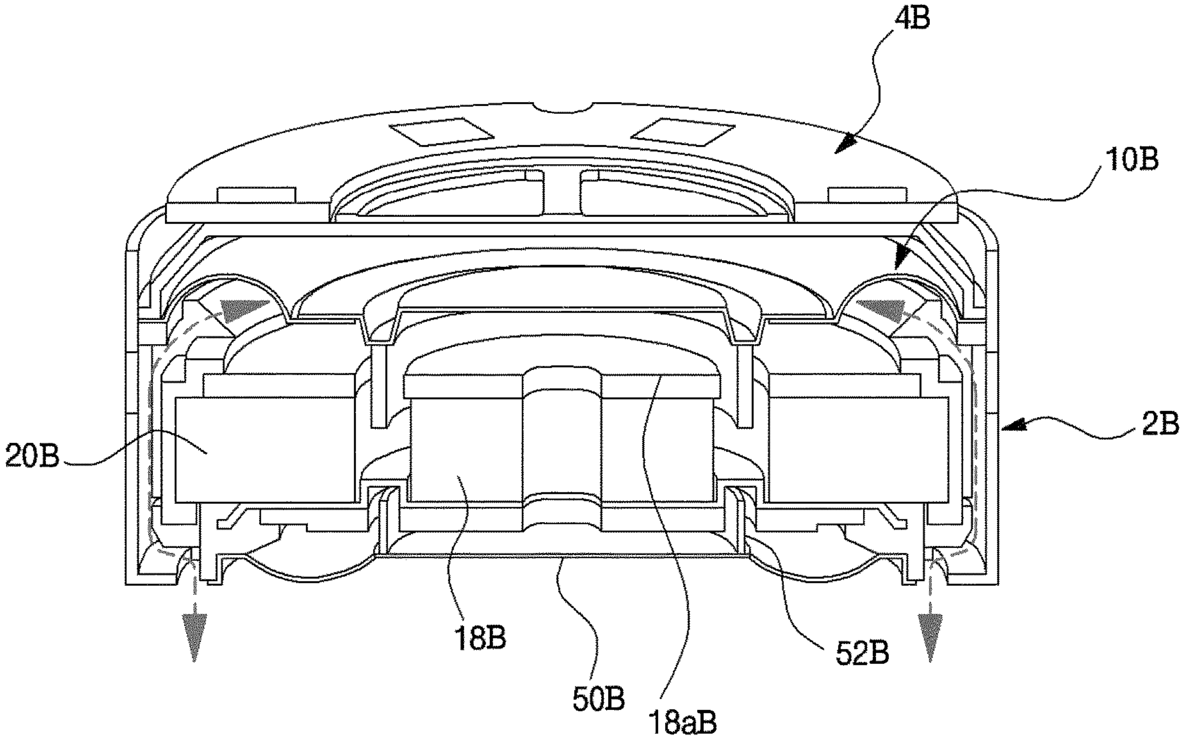
FIG. 13 is a sectional view showing the water drainage path of a microspeaker according to a sixth embodiment of the present invention taken along the center line thereof in the longitudinal direction thereof.
Figure 14:
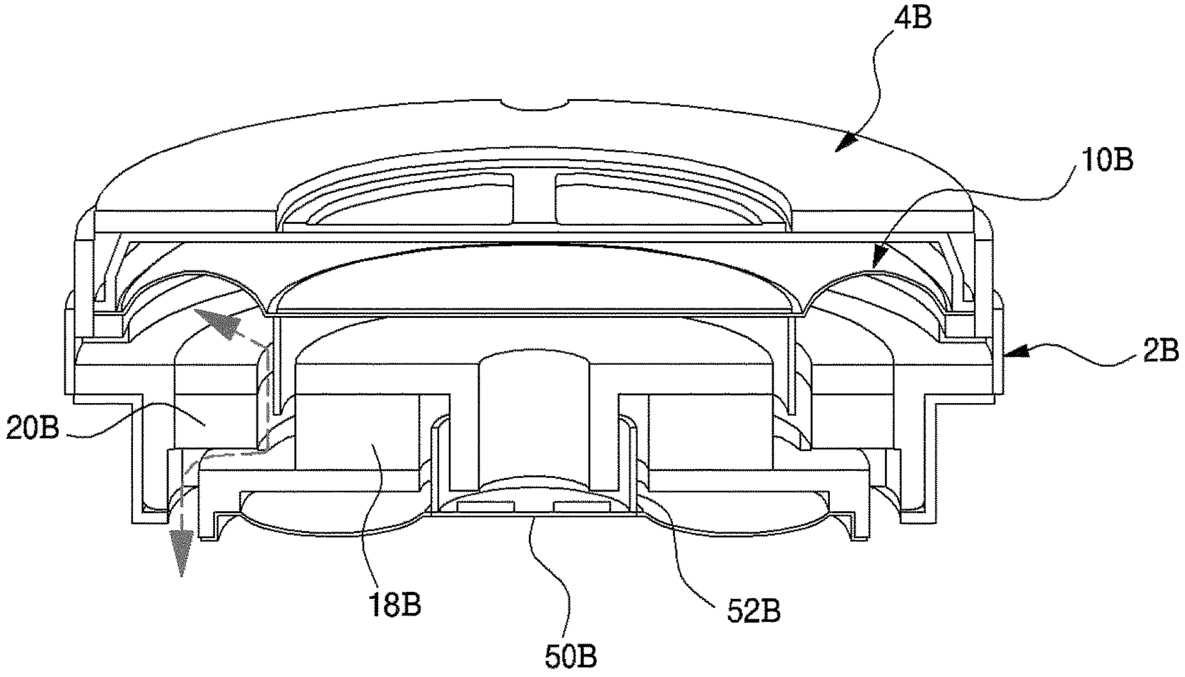
FIG. 14 is a sectional view showing the water drainage path of a microspeaker according to a seventh embodiment of the present invention taken along the center line thereof in the longitudinal direction thereof.
Figure 15:
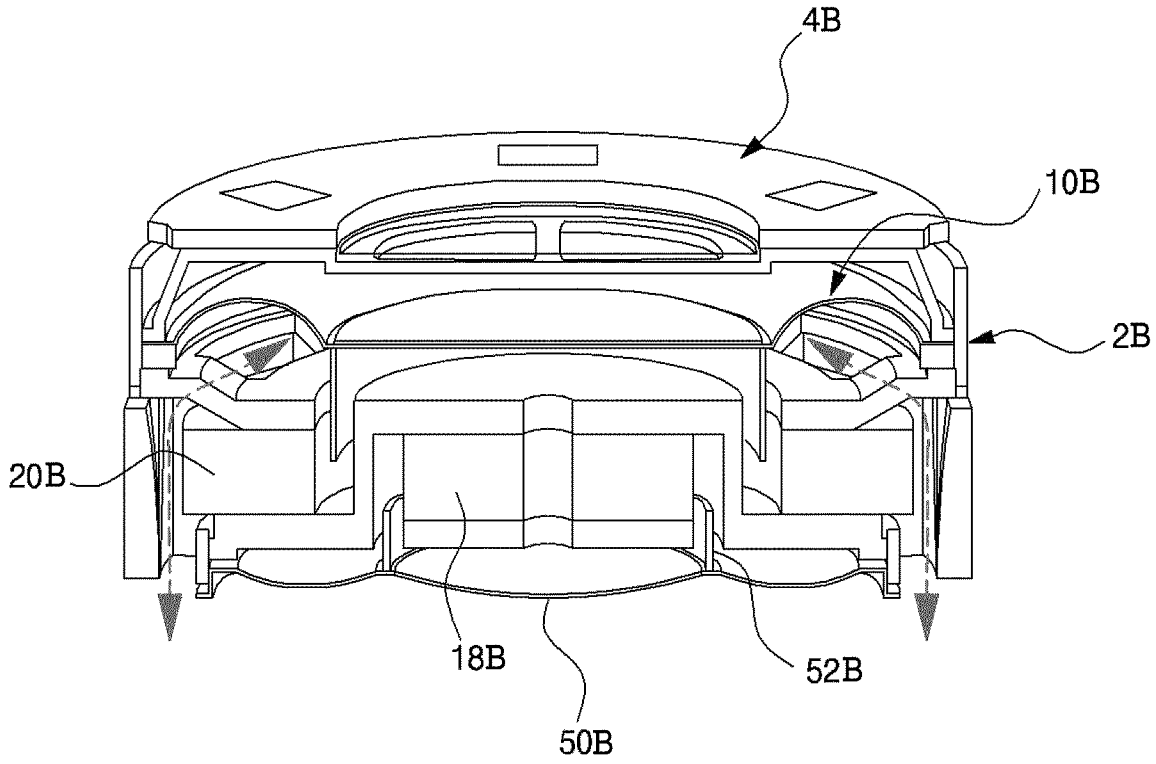
FIG. 15 is a sectional view showing the water drainage path of a microspeaker according to an eighth embodiment of the present invention taken along the center line thereof in the longitudinal direction thereof.

As described above, in the embodiment of the present invention, the vibration sound transmission path of the woofer diaphragm may simultaneously be used as a water drainage structure. The water drainage paths according to the sixth to eighth embodiments are shown by the arrows in FIGS. 13 to 15. According to the present invention, it may be possible to manufacture a compact 2-way type microspeaker without a separate water drainage structure. Members other than the members providing the sound emission path or the water drainage path are compressed substantially airtightly, so that water entering the speaker is not likely to infiltrate into other components. A water-repellent coating may be applied to the internal components of the micro speaker to prevent the infiltration of water.

<Coil Connection Structure for 2-Way Type Microspeaker>

Figure 16:
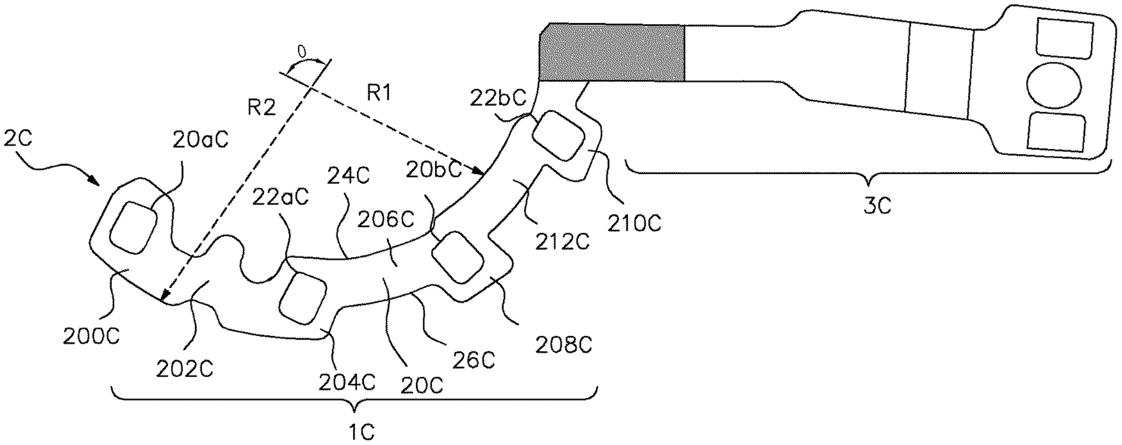
FIG. 16 is a diagram showing a connection portion constituting a part of the coil connection structure of a 2-way type microspeaker according to the present invention when viewed from above.

Next, referring to FIG. 16, a connection portion 1C constituting a part of a coil connection structure for a 2-way type microspeaker according to the present invention will be described. The connection portion 1C is preferably a flexible printed circuit board (FPCB) substrate.

The connection portion 1C is circuit-connected to a set substrate 3C. The set substrate 3C is a member that is connected to an external device. The connecting portion 1C is arranged on the same plane as a whole, whereas the set substrate 3C is erected in a portion connected with the connection portion 1C and exposed out of the microspeaker. The set substrate 3C itself is known, but is characterized in that the connection portion 1C is electrically connected to the set substrate 3C and the two members can be integrally manufactured in the manufacturing process. The set substrate 3C may be subject to various changes in itself, and this does not limit the scope of the present invention.

The appearance of the connection part 1C is formed by a base 2C extending long to be bent in a circular shape as a whole. Although the base 2C intermittently has depressions and protrusions, the inner surface 24C is formed along the radius of curvature R1, and the outer surface 26C is formed along the radius of curvature R2, as a whole. The reason for forming part of the virtual circle in this way is to conform to the fact that the connection portion 1C is disposed along the outer circumference of the circular microspeaker. In the base 20C, a first segment 200C, a second segment 204C, a third segment 208C, and a fourth segment 210C that are more convex than other portions are sequentially formed at intervals in the direction from one end (the left side of the drawing) toward the set substrate 3C. In addition, a first bridge 202C is connected between a first segment 200C and a second segment 204C, a second bridge 206C is connected between the second segment 204C and a third segment 208C, and a third bridge 212C is connected between the segment 208C and a fourth segment 210C.

A soldering portion 20*a*C that is concave in an appropriate shape is formed on the first segment 200C, a soldering portion 22*a*C is formed on the second segment 204C, a soldering portion 20*b*C is formed on the third segment 208C, and a soldering part 22*b*C is formed on the fourth segment 210C. The tweeter wire Tw of a (+) terminal is soldered to the soldering portion 20*a*C, and the tweeter wire Tw of a negative terminal is soldered to the soldering portion 20*b*. The woofer wire Ww of a (+) terminal is soldered to the soldering part 20*b*C, and the woofer wire Ww of a negative terminal is soldered to the soldering part 22B. As will be described later, in the 2-way type microspeaker of the present invention, a woofer diaphragm 7C (see FIG. 18) is disposed at the top, a tweeter diaphragm 5C is disposed at the bottom, and a wire connected to the woofer voice coil 9C is drawn from the top to the bottom along the side of the speaker. Accordingly, as shown in the drawing, the third segment 208C and the fourth segment 210C are convex outward, i.e., toward the outside of the speaker, so that it is convenient and advantageous for the drawing and soldering of the wires. Meanwhile, since the wire connected to the tweeter voice coil 6C is drawn out along the same plane as a whole, it is not necessary to be convex out of the speaker. As shown in the drawing, being relatively convex toward the inside of the speaker may be viewed as being convenient for the drawing and soldering of the wires.

Each of the bridges 202C, 206C, and 212C may have a smooth curved shape, or may have a depression and protrusion portion to impart elasticity according to the shape of a surrounding member to be attached.

Since the connection part 1C of the present invention is formed of a flexible printed circuit board (FPCB), a circuit of a predetermined pattern is formed and the wire may be soldered to the soldering portion of each segment to immediately secure conductivity, so that it is suitable for application to a small TWS microspeaker.

As long as the connection portion 1C described above has a curved shape and has respective segments having soldering portions for woofer and tweeter wires, the shape and structure thereof do not limit the scope of the present invention and various modifications may be possible.

Figure 17:
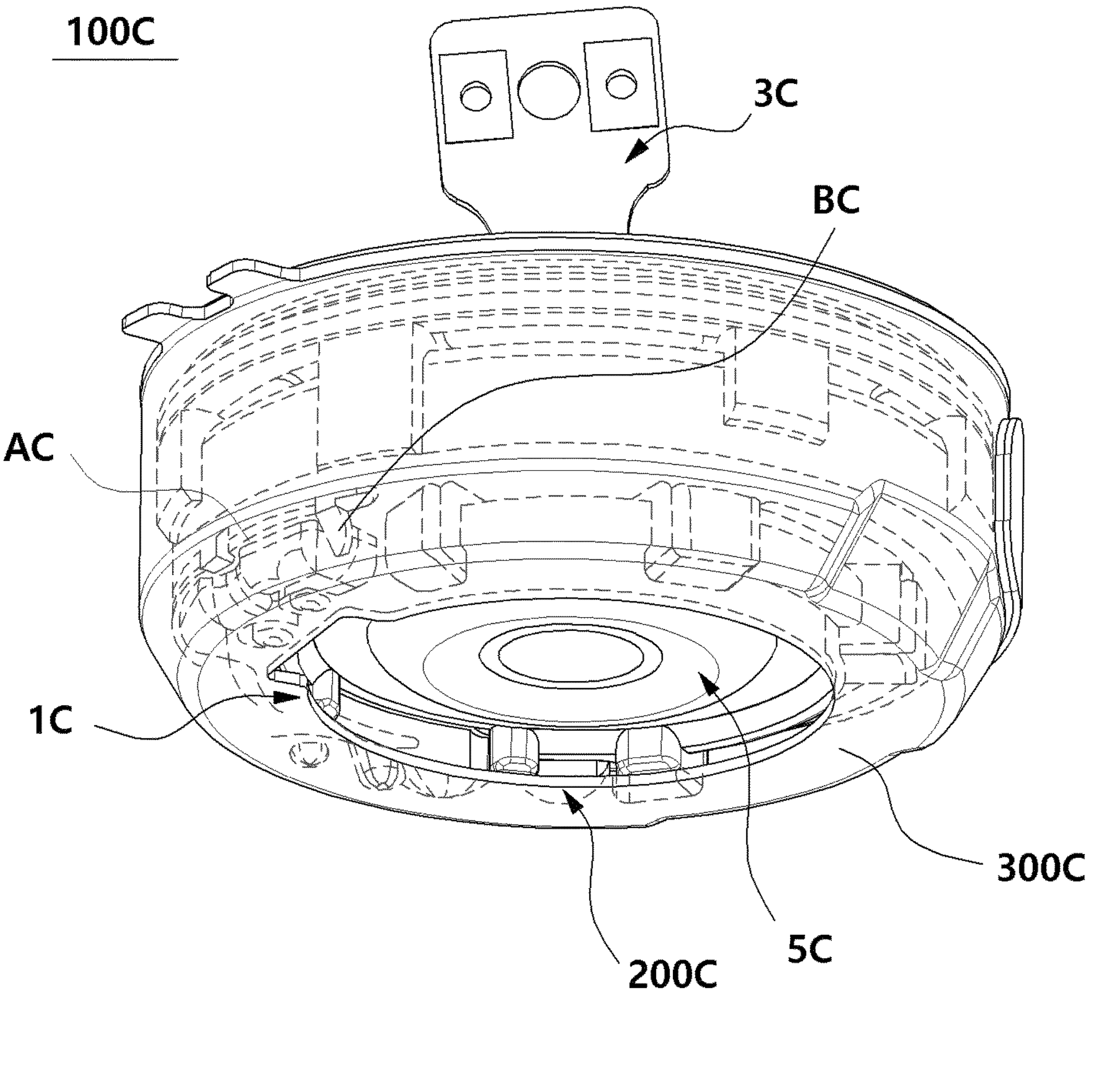
FIG. 17 is a view viewed from below so that the inside of the lower portion of a 2-way type microspeaker equipped with the connection part of the present invention described above is visible.

FIG. 17 is a view viewed from below so that the inside of the lower portion of the 2-way type microspeaker 100C equipped with the connection part 1C of the present invention described above is visible.

The appearance of the microspeaker 100C is formed by a metal frame 300C. The tweeter diaphragm 5C is mounted in the bottom of the microspeaker 100C, and the connection part 1C is mounted on a frame 200C located between the tweeter diaphragm 5C and the metal frame 300C. The connection portion 1C may be soldered to the frame 200C, or may be partially inserted into a slot formed by being machined in advance in the frame 200C. It is preferable that the connection part 1C of the present invention be installed not to be located below the tweeter diaphragm 5C when viewed in the height direction. Then, since the soldering portion is located on the same plane as the tweeter diaphragm 5C or at a very slight height difference, an increase in the overall length of the microspeaker 100C attributable to the connection part 1C may be suppressed, and a great degree of design freedom may be acquired. In FIG. 17, "AC" denotes a soldering area in which the connection portion 1C is bonded to the frame 200C, and "BC" denotes the soldering area of the soldering portions 20*a*C, 22*a*C, 20*b*C, and 22*b*C.

Figure 18:
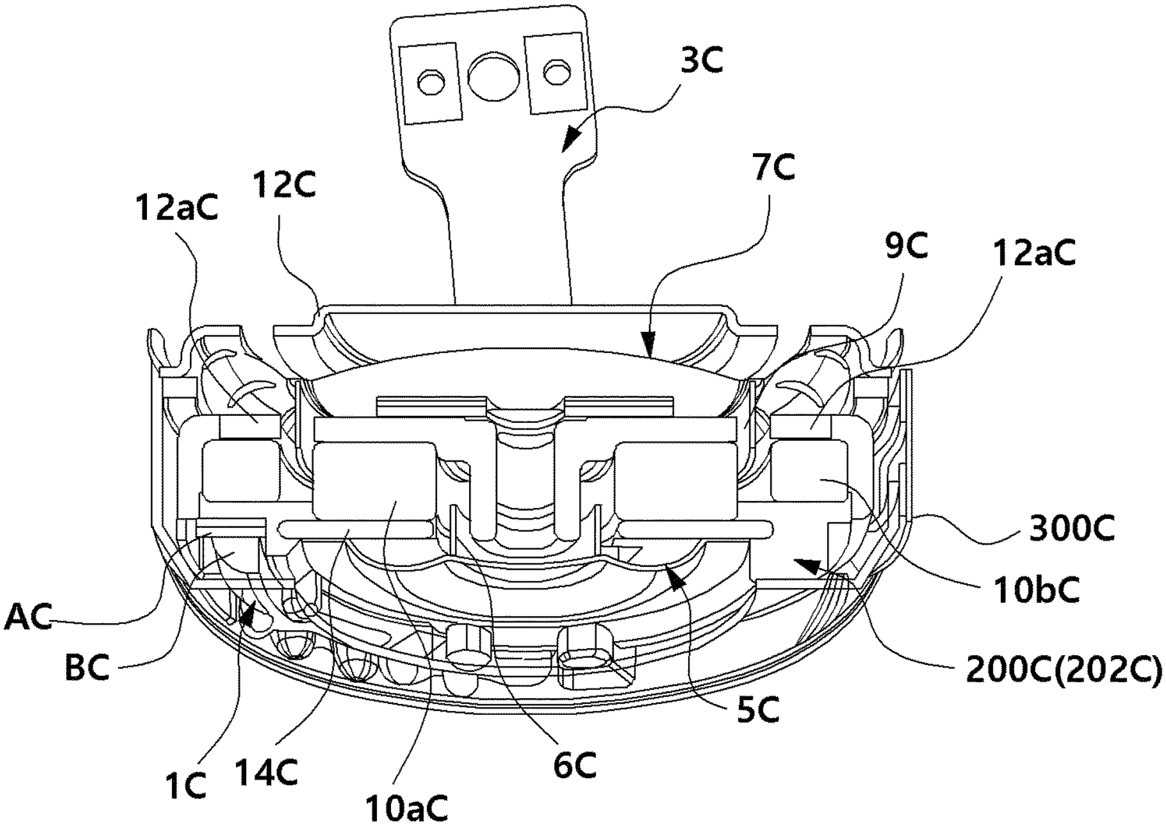
FIG. 18 is an internal sectional view of the 2-way type microspeaker of FIG. 17.

FIG. 18 is an internal sectional view of the 2-way type microspeaker 100C of FIG. 17. In the microspeaker 100C, members related to the connection portion 1C will be chiefly described, and detailed descriptions of other members will be omitted in order to prevent the gist of the present invention from being obscured.

A woofer diaphragm 7C is mounted in the top portion of the 2-way type microspeaker 100C, and a woofer voice coil 9C is coupled to the bottom surface of the woofer diaphragm 7C, more specifically the bottom surface of the boundary portion between the center and edge domes. An inverted dome-shaped tweeter diaphragm 5C smaller than the woofer diaphragm 7C is mounted under the woofer diaphragm 7C to face the woofer diaphragm 7C, and a tweeter voice coil 6C is coupled to the top surface of the tweeter diaphragm 5C, more particularly the top surface of the boundary portion between the center and the edge domes.

An inverted and reversed "L"-shaped first upper plate 12C in which a circular passage hole is formed in the height direction is mounted under the center dome of the woofer diaphragm 7C, and a flat second upper plate 12*a*C is installed under the edge dome so as to face the first upper plate from the side while forming a space in which the woofer voice coil 9C extends. In addition, an annular main magnet 10*a*C is mounted on the bottom surface of the first upper plate 12C by surrounding the central passage groove, and an annular sub-magnet 10*b*C is mounted on the bottom surface of the second upper plate 12*a*C.

A flat lower plate 14C supporting the main magnet 10*a*C is mounted over the center and edge domes of the tweeter diaphragm 5C.

The diaphragm, voice coil, plates and magnets described above constitute the "driver" or "drive module" of a speaker as well known to those skilled in the art.

The frame 200C of the present invention is interposed between the tweeter diaphragm 5C and the metal frame 300C, but the left and right shapes are asymmetric. In other words, the connection portion 1C is accommodated in the left portion of the drawing. However, since the connection portion 1C is not mounted on the right side, formation is made to come into contact with the outer surface of the second upper plate 12*a*C and the outer surface and bottom surface of the sub-magnet 10*b*C and accommodates or abuts the outer surfaces of the lower plate 14C and the tweeter diaphragm 5C so that there is no empty space between these members, as shown in the drawing. However, the left side of the frame 200C is the same as the right side thereof in the structure up to the height covering the outer and bottom surfaces of the sub-magnet 10*b*C, but the lower structure has been deleted and the thick portion 202C on the right is not present on the left side. Instead, the connection part 1C of the present invention is installed in this part so that the top surface thereof is bonded to the frame 200C through the soldering area AC. Accordingly, the installation height of the connection portion 1C of the present invention is substantially the same as that of the lower plate 14C and/or the tweeter diaphragm 5C, so that the overall length of the microspeaker may be considerably reduced.

Furthermore, when the connection portion 1C of the present invention is discussed in terms of width, it is relatively thin and is at least smaller than the width of the sub-magnet 10*b*C. Accordingly, although the connection part 1C of the present invention is bonded to the frame 200C, the overall structure may be viewed as being located within a space formed by the "driver" of the speaker or across the boundary. In particular, since each segment and bonded portion of the connecting portion 1C are located at least substantially the same height as the tweeter diaphragm in the space formed by the driver, the overall length of the 2-way type microspeaker may be reduced and space may be saved as described above.

Figure 19:
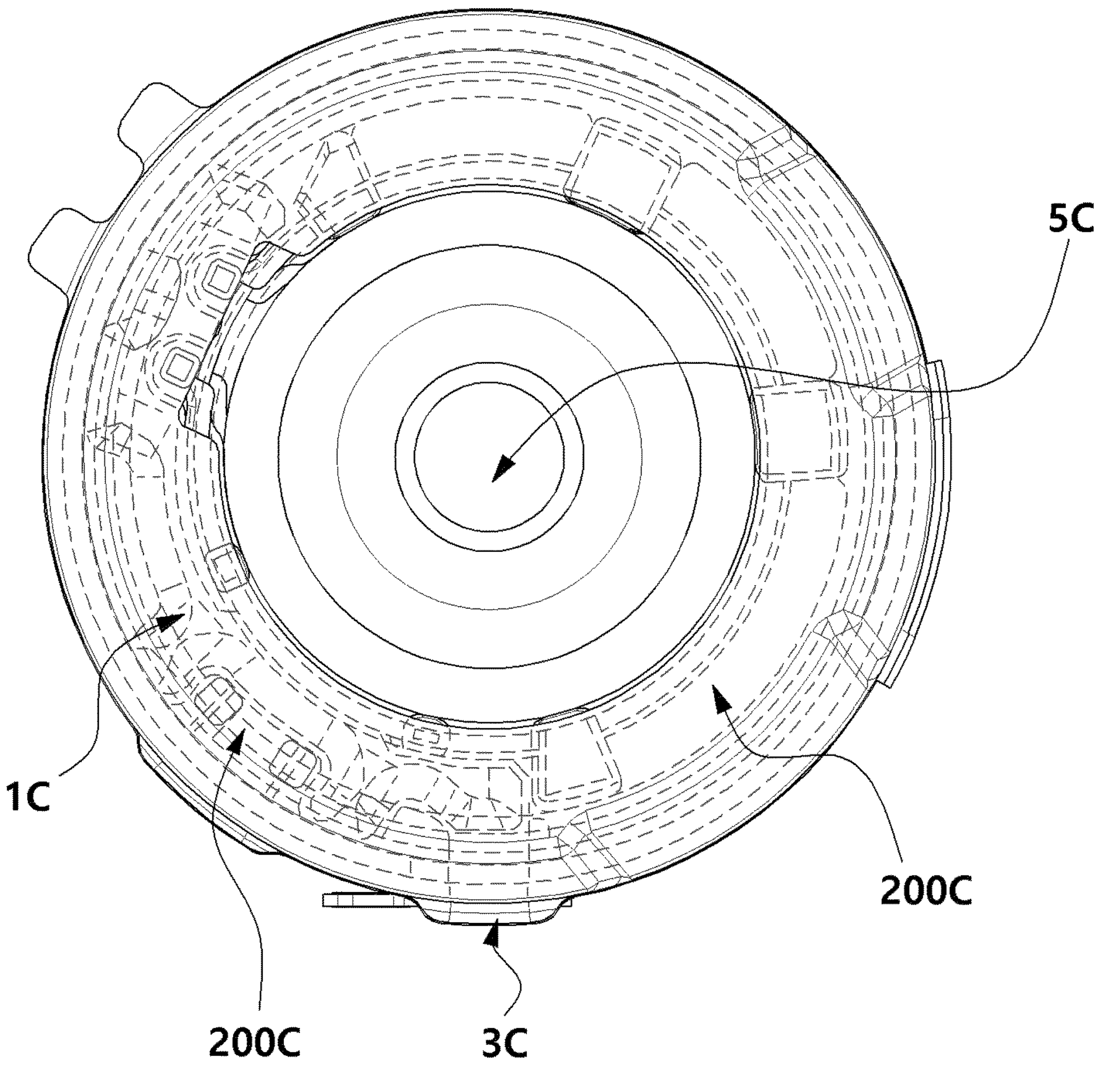
FIG. 19 is a view of FIG. 17 when viewed from the bottom surface of the tweeter diaphragm.

FIG. 19 is a view of FIG. 17 when viewed from the bottom surface of the tweeter diaphragm 5C. The frame 200C is generally annular to fit the shape of the micro-speaker. The connection part 1C is molded and mounted to form a circular curvature between at least ¼ and ½ of the overall outer circumference of the frame 200C, as described in FIG. 16. Another reason why the connecting portion 1C extends along the frame 200C while forming a circular curvature to a certain extent is to extend toward the set substrate 3C and be connected thereto in an integrated manner. Therefore, the structure and shape are inevitably different from the terminal plates formed to extend vertically in the prior patents that do not presuppose the set substrate.

Figure 20:
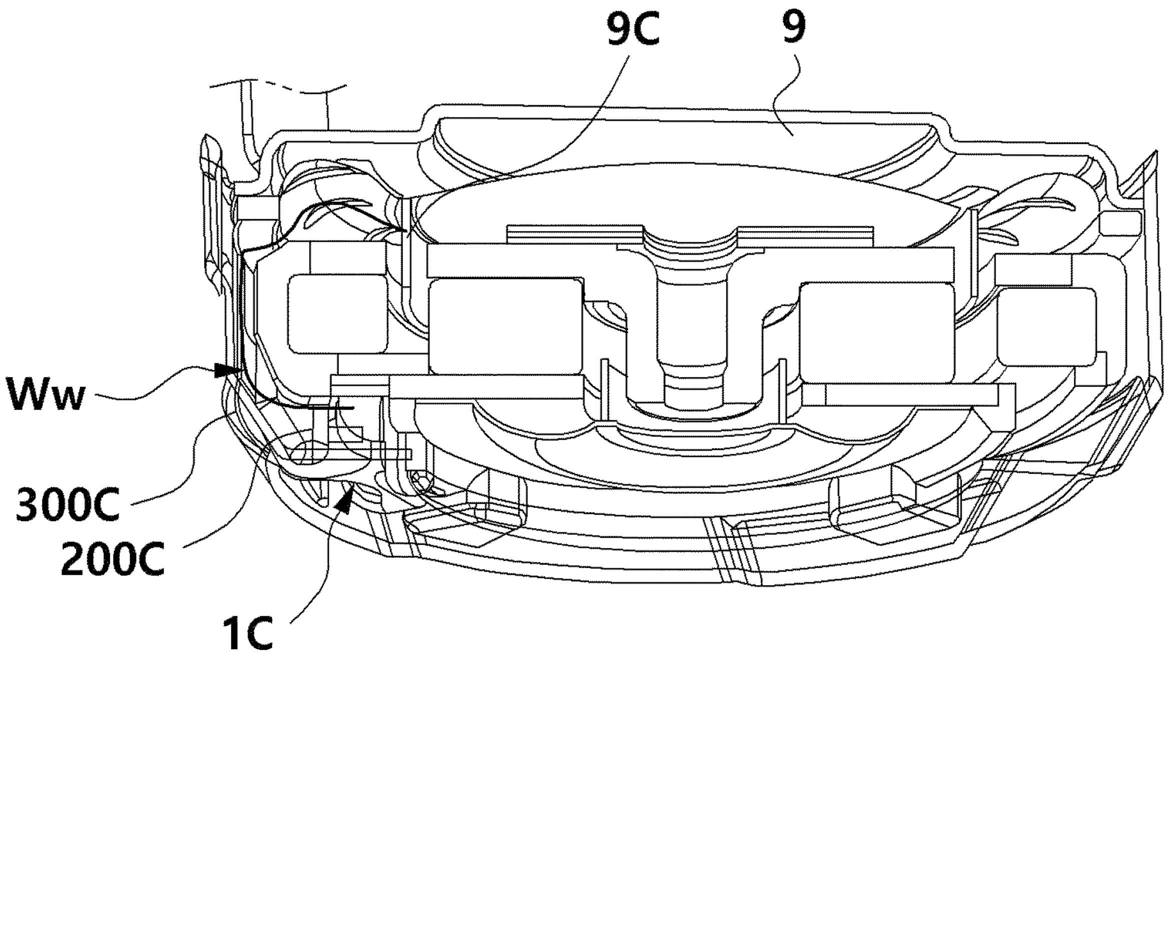
FIG. 20 is a side view showing a connection structure between a connection part and a woofer wire drawn out from a woofer voice coil according to the present invention.

FIG. 20 is a side view showing a connection structure between the connection part 1C and the woofer wire Ww drawn out from the woofer voice coil 9C according to the present invention. A woofer structure is located at the top of the speaker, so it is natural that a woofer wire Ww extends downward. In this case, the woofer wire Ww is drawn downward along the outer side space formed by the metal frame 300C and the frame 200C, and is soldered to the third segment 208C and the fourth segment 210C. Since the woofer wire Ww enters from the outside of the connection part 1C, the configuration in which segments 208C and 210C are convex toward the outside of the speaker is convenient for the drawing and soldering of the wires, as described above.

Figure 21:
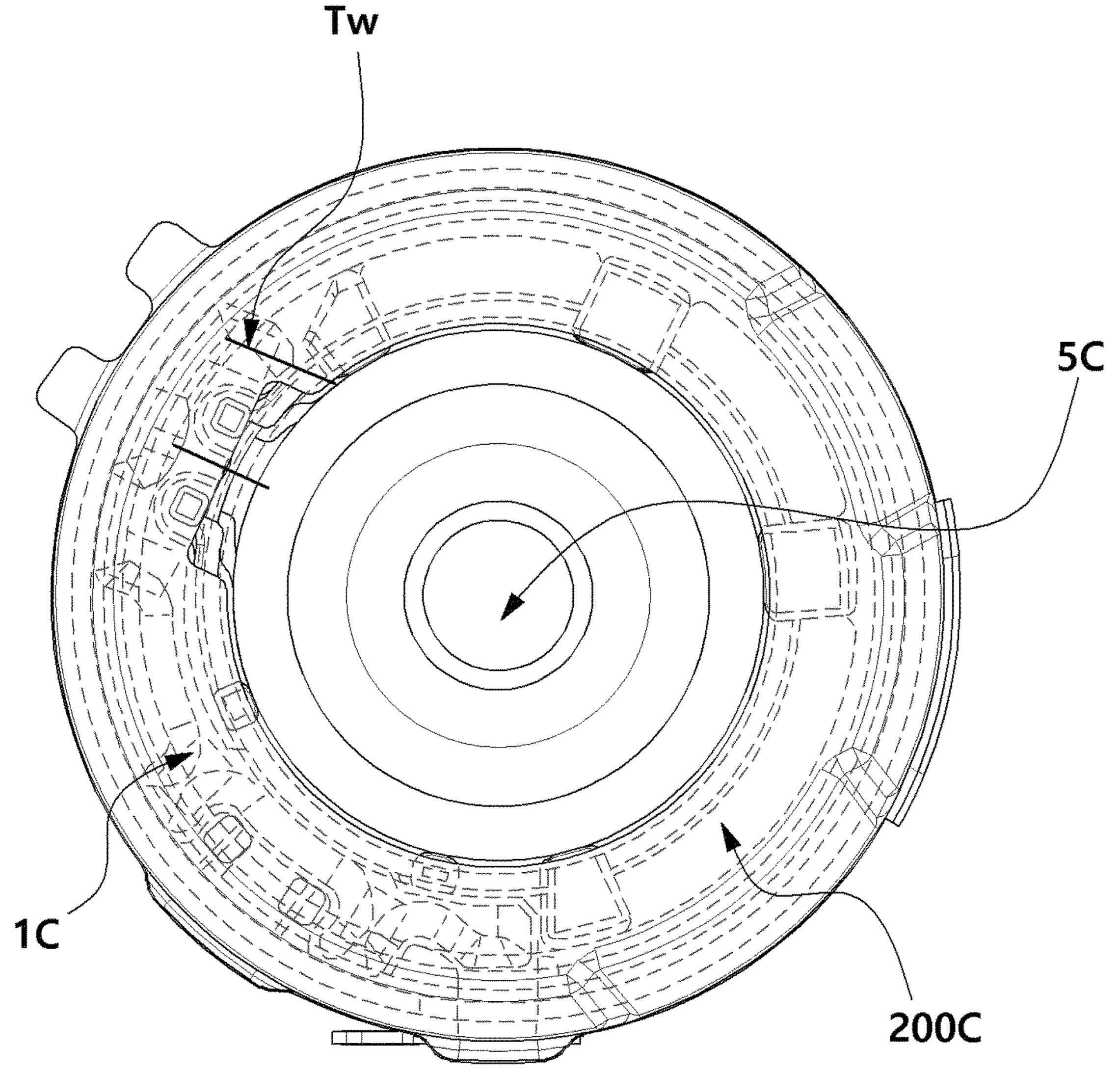
FIG. 21 is a diagram showing a state in which the tweeter wire connected to the tweeter voice coil is connected to the connection portion in the structure of FIG. 17.

FIG. 21 is a diagram showing a state in which the tweeter wire Tw connected to the tweeter voice coil 6C is connected to the connection portion 1C in the structure of FIG. 17. The tweeter wire Tw is directly drawn out to the side over a short distance through the tweeter diaphragm 5C and the lower plate 14C. Since the tweeter wire Tw enters from the inside of the connection part 1C, it is reasonable in terms of space saving that the related segments 200C and 204C are convex toward the inside of the speaker as possible, as described above.

Figure 22A:
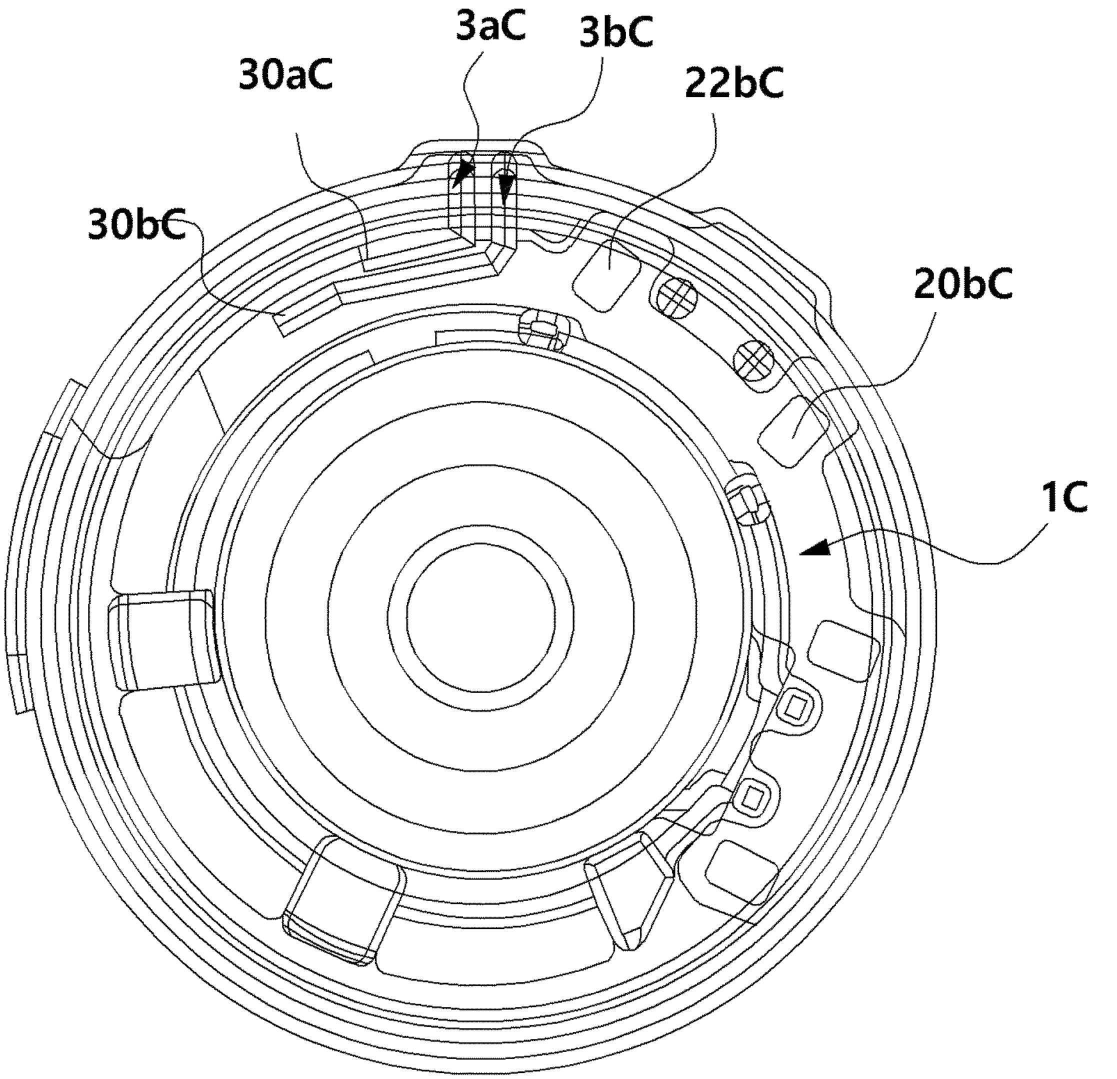
FIG. 22A is a view of a connection part according to another embodiment of the present invention when viewed from below.
Figure 22B:
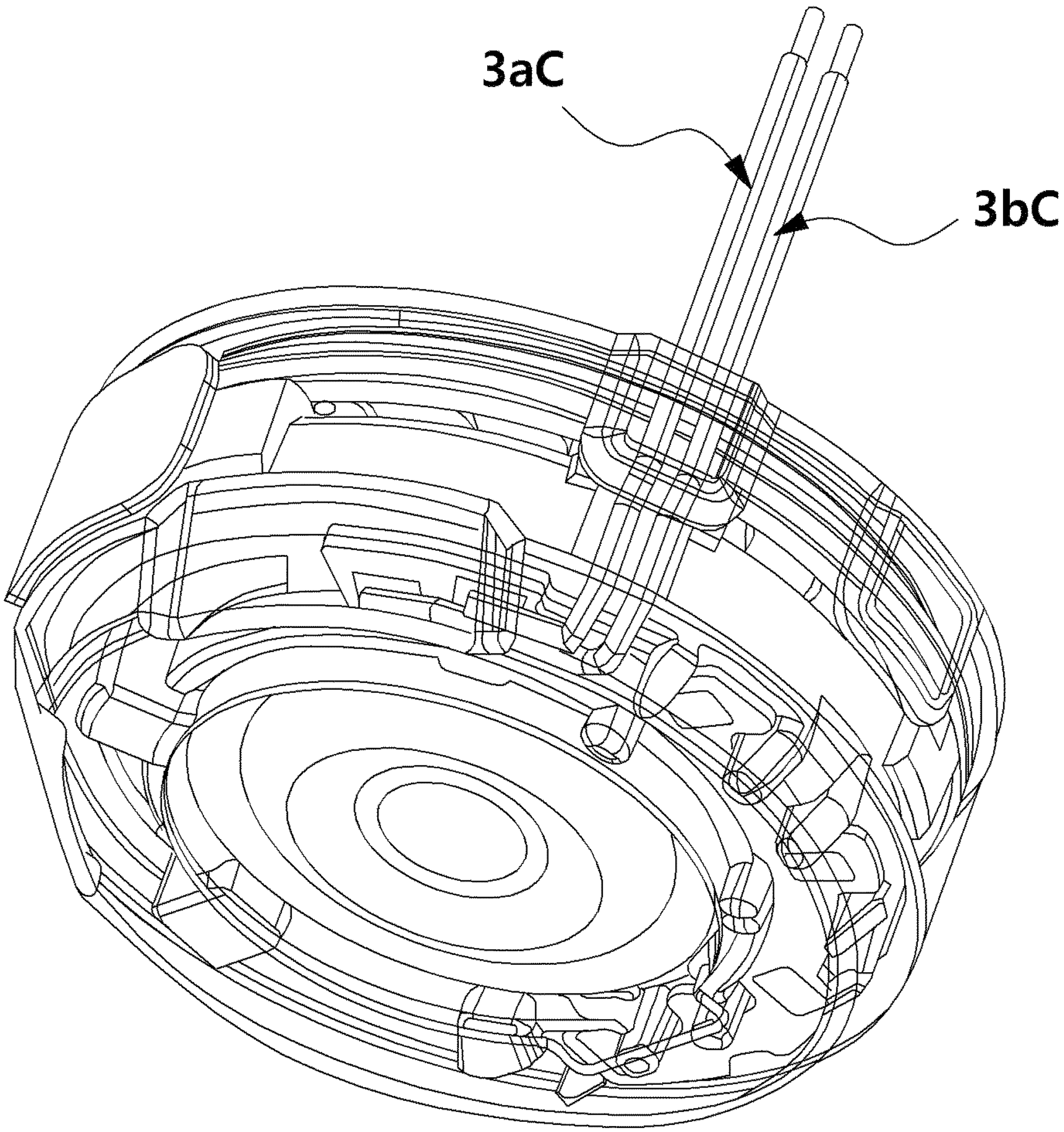
FIG. 22B is a bottom perspective view of FIG. 22A.

FIG. 22A is a view of a connection part 1C according to another embodiment of the present invention when viewed from below, and FIG. 22B is a bottom perspective view of FIG. 22A.

The difference between the present embodiment and the previous embodiments is that the connection portion 1C is not directly connected to the set substrate 3C, but is connected to a set (not shown) through lead wires 3*a*C and 3*b*C. Accordingly, first sides of the soldering portions 20*b*C and 22*b*C are further extended than in the previous embodiments to form soldering portions 30*a*C and 30*b*C for the respective lead wires 3*a*C and 3*b*C connected to the set, and the individual wires are stored to the respective soldering portions. In this case, the connection part 1C may be formed of a printed circuit board (PCB). In this manner, it may be possible to efficiently reduce the space of the speaker required to mount the set substrate 3C.

According to the present invention, the water-repellent coating is applied to the internal components of the micro-speaker, and water is rapidly and efficiently discharged from the inside of the housing of the speaker, particularly around the driver, thereby protecting the speaker from water.

It will be appreciated that the present invention achieves a clearly improved effect compared to the conventional technology that does not have a water drainage structure and thus has to wait for water to remain and evaporate.

According to the present invention, there is achieved the effect of providing the 2-way type microspeaker that can rapidly and efficiently discharge introduced water, protect fine components from the remaining and infiltration of water, has high magnetic flux density, and can efficiently perform sound pressure tuning.

According to the present invention, there is achieved the effect of manufacturing the compact, high-density 2-way type microspeaker by using the woofer sound emission path as the water drainage path.

According to the present invention, there is achieved the effect of providing the connection structure that is capable of securing design freedom by locating the four soldering points where the woofer and the tweeter wires are joined inside or at the boundary of the space formed by the driver rather than outside of the driver, and that is particularly suitable for the TWS type 2-way type microspeaker and also providing the 2-way type microspeaker including this connection structure.

The above-described embodiments are merely illustrative of the technical spirit of the present invention, and it will be appreciated by those of ordinary skill in the art to which the present invention pertains that various modifications and alterations may made to the embodiments without departing from the essential characteristics of the present invention.

What is claimed is:

1. A 2-way type microspeaker comprising a woofer and a tweeter, wherein a connection portion to which a woofer wire drawn from a woofer voice coil coupled to a woofer diaphragm and a tweeter wire drawn from a tweeter voice coil coupled to a tweeter diaphragm are bonded is disposed on one side of the tweeter diaphragm, and wherein an installation location of the connection portion is a height identical or adjacent to that of the tweeter diaphragm.

2. The 2-way type microspeaker of claim 1, wherein the connection portion comprises at least one segment having a soldering portion to which the tweeter wire is bonded, and at least one segment having a soldering portion to which the woofer wire is bonded.

3. The 2-way type microspeaker of claim 1, wherein the connection portion has a shape forming a circular curved surface.

4. The 2-way type microspeaker of claim 1, wherein the woofer diaphragm is disposed in an upper portion, and the tweeter diaphragm is smaller than the woofer diaphragm and is installed in a lower portion.

5. The 2-way type microspeaker of claim 4, wherein an appearance of the microspeaker is formed by a metal frame, and the connection portion is soldered to a frame mounted between the tweeter diaphragm and the metal frame.

6. The 2-way type microspeaker of claim 5, wherein the woofer wire is drawn to the lower portion along the metal frame and an outer side space formed by the frame and is soldered to each segment.

7. The 2-way type microspeaker of claim 6, wherein the tweeter wire passes through a side of the tweeter diaphragm and is directly soldered to each segment.

* * * * *